United States Patent [19]
Goldman et al.

[11] Patent Number: 5,208,526
[45] Date of Patent: May 4, 1993

[54] ELECTRICAL POWER STORAGE APPARATUS

[75] Inventors: Arnold J. Goldman; Jonathan Goldstein; Menachem J. Korall, all of Jerusalem, Israel

[73] Assignee: Luz Electric Fuel Israel Ltd., Jerusalem, Israel

[21] Appl. No.: 636,450

[22] Filed: Dec. 31, 1990

Related U.S. Application Data

[63] Continuation-in-part of Ser. No. 555,921, Jul. 19, 1990, Pat. No. 5,121,044.

[51] Int. Cl.$^5$ .......................... H02J 7/00; H01M 8/08
[52] U.S. Cl. ......................................... 320/2; 320/15; 429/15; 429/27
[58] Field of Search ................. 320/2, 15; 429/15, 26, 429/27

[56] References Cited

U.S. PATENT DOCUMENTS

| | | | |
|---|---|---|---|
| 4,126,733 | 11/1978 | Doniat | 429/12 |
| 4,147,839 | 4/1979 | Solomon et al. | 429/15 |
| 4,218,520 | 8/1980 | Zaromb | 429/15 |
| 4,274,043 | 6/1981 | Heitz | 320/15 X |
| 4,305,999 | 12/1981 | Zaromd | 429/14 |
| 5,006,424 | 4/1991 | Evans et al. | 429/27 X |
| 5,121,044 | 6/1992 | Goldman | 320/2 |

Primary Examiner—R. J. Hickey
Attorney, Agent, or Firm—Helfgott & Karas

[57] ABSTRACT

A rechargeable, electrical power storage system employing an electrical power storage medium in the form of a slurry containing active metal particles and an electrolyte solution, which system includes one or more metal-air cells, each including outer electrode apparatus including air electrode apparatus and being configured to define a liquid permeable housing; a volume of the active metal particles arranged within the housing so as to define a static bed which is saturated with the electrolyte solution; inner electrode apparatus arranged within the housing so as to be surrounded by the static bed. The system also includes apparatus for circulating an electrolyte solution through the static bed so as to dissolve discharge products that form therein as the slurry becomes electrically discharged, and apparatus for removing the dissolved discharge products from the circulating electrolyte. The electrical power storage system may be used for powering an electric vehicle. An electrical energy system includes an electric utility having electricity generation apparatus and distribution lines, and rechargeable electrical power storage apparatus which provides energy to the electric utility, when required. The rechargeable electrical power storage apparatus may optionally also be used for the regeneration of slurry for replacement of electrically discharged slurry in the electrical power storage system of an electric vehicle.

69 Claims, 21 Drawing Sheets

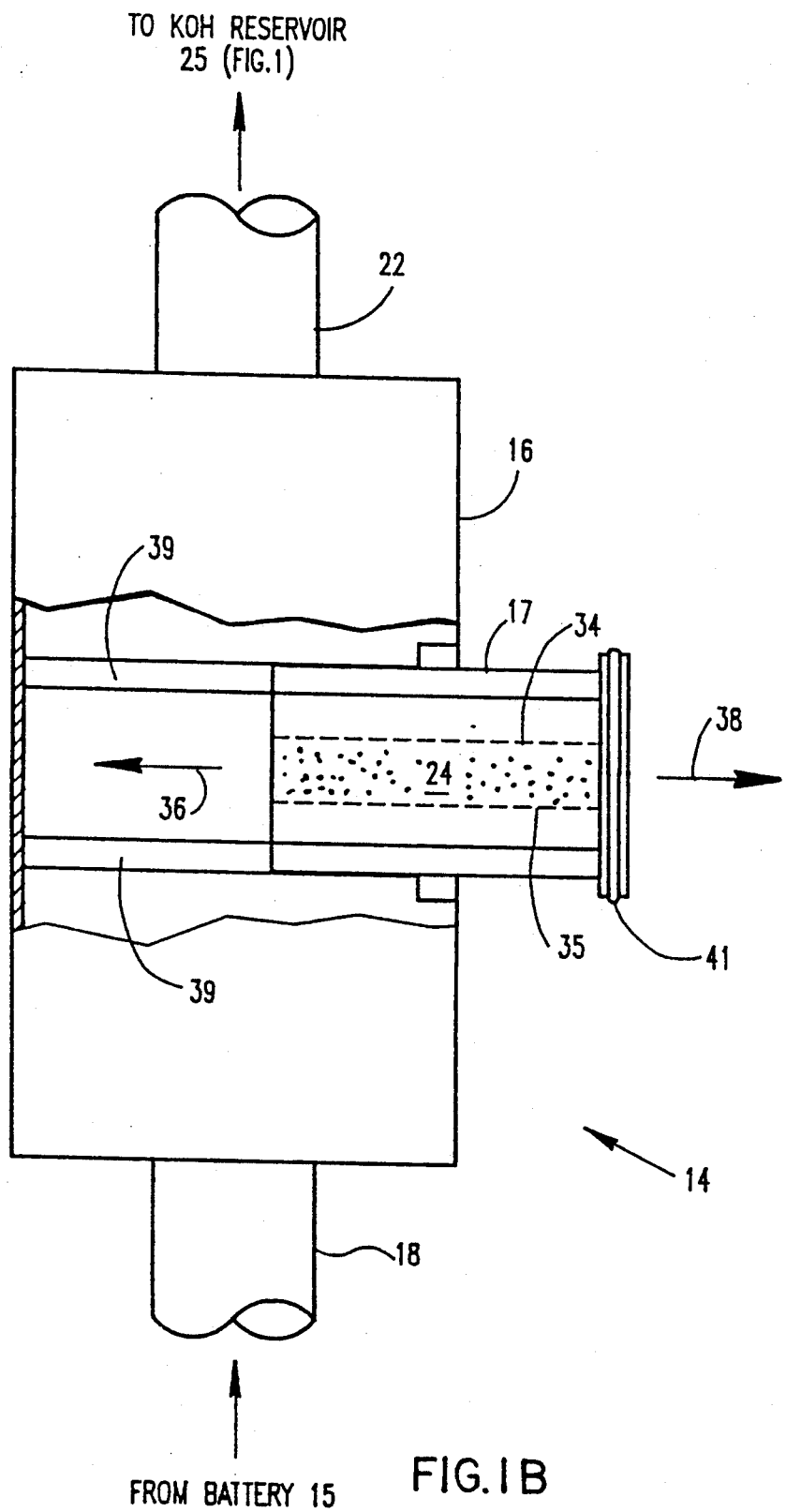

ELECTRICAL POWER STORAGE APPARATUS

REFERENCE TO CO-PENDING APPLICATIONS

The present application is a continuation-in-part of U.S. application Ser. No. 07/555,921, filed Jul. 19, 1990, entitled ELECTRICAL ENERGY SYSTEM now U.S. Pat. No. 5,121,044.

FIELD OF THE INVENTION

The present invention relates to rechargeable electric power storage apparatus.

BACKGROUND OF THE INVENTION

Over the years, various proposals have been made for electric powered vehicles. To date, for a number of reasons, electric vehicle systems have yet to become commercial for urban and highway applications.

There have been proposals to employ zinc/air batteries for urban vehicle propulsion. An example is the following publication:

Improved slurry zinc/air systems as batteries for urban vehicle propulsion, by P. C. Foller, Journal of Applied Electrochemistry 16 (1986), 527–543.

Metal/air battery structures are described in the following publications:

U.S. Pat. No. 4,842,963, entitled Zinc Electrode and Rechargeable Zinc-Air Battery;

U.S. Pat. No. 4,147,839, entitled Electrochemical Cell with Stirred Slurry;

U.S. Pat. No. 4,908,281, entitled Metal/air Battery with Recirculating Electrolyte;

U.S. Pat. No. 3,847,671, entitled Hydraulically-Refuelable Metal-Gas Depolarized Battery System;

U.S. Pat. No. 3,716,413, entitled Rechargeable Electrochemical Power Supply;

U.S. Pat. No. 4,925,744, entitled Primary Aluminum-Air Battery;

U.S. Pat. No. 4,341,847, which describes an electrochemical generator having two sedimentation-bed chambers fed in series with an electrolyte which contains particles; and U.S. Pat. No. 4,719,156, which describes a power storage system employing an aluminum-air cell in which solid discharge products are formed. The system includes means for recirculating electrolyte from the cell so as to flush out the solid discharge products therein. This is achieved by use of a precipitation chamber employing an impeller. Discharge product-free electrolyte is thereafter returned to the cell.

Electrical energy storage systems are described in the following publications:

U.S. Pat. No. 4,843,251 entitled Energy Storage and Supply Recirculating Electrolyte;

Energy on Call by John A. Casazza et al, IEEE Spectrum June, 1976, pp 44–47.

U.S. Pat. No. 4,275,310, entitled Peak Power Generation;

U.S. Pat. No. 4,124,805, entitled Pollution-Free Power Generating and Peak Power Load Shaving System; and U.S. Pat. No. 4,797,566, entitled Energy Storing Apparatus.

Zinc-air batteries using a replaceable slurry are known. These obviate the problem of dendrite formation in batteries with bifunctional electrodes.

Among disadvantages inherent in zinc-air batteries, however, is that the functional life and ease of rechargeability employing thereof is limited, due to the formation of non-electrically conductive zinc oxide within the slurry, upon electrical discharge thereof.

Further system problems that occur with metal-air systems in general, are the generation thereby of excess heat, and the drying out of the metal-based electrolytic slurry.

The following references describe zinc-air power storage systems including a zinc anode, an air electrode, and means for circulating an electrolyte liquid:

U.S. Pat. No. 3,359,136 entitled Rechargeable Energy Conversion System;

U.S. Pat. No. 3,505,113 entitled Rechargeable Energy Conversion Process;

U.S. Pat. No. 3,708,345 entitled Electrochemical Energy Conversion System. This reference also teaches the use of a jet pump so as to scour zinc oxide discharge deposits from the anode.

U.S. Pat. No. 3,666,561 entitled Electrolyte Circulating Battery;

U.S. Pat. No. 4,842,963 entitled Zinc Electrode And Rechargeable Zinc-Air Battery. The described battery is electrically rechargeable and also includes means for filtering zinc oxide discharge products accumulating in the circulating electrolyte. Zinc is plated out during recharging of the battery.

The following reference describe zinc-air power storage systems employing a continuously circulated slurry of zinc powder suspended in an electrolyte:

U.S. Pat. No. 3,977,903 entitled Forced-Flow Electrochemical battery;

U.S. Pat. No. 4,038,458 entitled Zinc-Air Electrochemical Cell;

U.S. Pat. No. 4,126,733 entitled Electrochemical Generator Comprising An Electrode In The Form Of A Suspension;

U.S. Pat. No. 4,341,847 entitled Electrochemical Zinc-Oxygen Cell; and

U.S. Pat. No. 3,887,400 entitled Method And Apparatus For Electrochemically Producing An Electrical Current.

A disadvantage inherent in above-listed patents describing the continuous recirculation of a zinc-containing electrolyte slurry is that, in order to provide a power storage system of sufficient capacity to power a vehicle, the overall weight of such a system would be so large and heavy as to render its use impractical.

A further publication teaching the continuous circulation of a slurry of zinc powder and electrolyte is U.S. Pat. No. 3,981,747, entitled Process For Producing Electric Current By The Electrochemical Oxidation Of An Active Anodic Metal, Especially Zinc. Although this reference specifically teaches that continuous recirculation of zinc particles and electrolyte slurry does not in itself prevent passivation of the zinc during discharge, the system described in this reference is, nonetheless, based on a continuous circulation of such a slurry, but wherein the precipitation of discharged zincate from solution is provided by the addition of a lightweight material, such as aluminum.

The following additional references are also noted:

U.S. Pat. No. 3,520,728 entitled Electrical Accumulator With A Metal Hydride Serving As The Cathodic Reactive Material Arranged In Suspension In The Electrolyte describes a slurry of metal hydride particles and an electrolyte which flows through an electrochemical cell.

U.S. Pat. No. 3,554,810 entitled Metal-Oxygen Power Source describes a metal-air power source with a reversibly collapsible electrolyte storage means.

U.S. Pat. No. 4,005,061 is directed to a method of recovering potassium hydroxide and zinc oxide from potassium zincate solutions by the addition thereto of an organic solvent.

U.S. Pat. No. 4,283,466 is directed to a process for chemical reaction using flowing slurry.

U.S. Pat. No. 4,521,497 describes an electrically rechargeable zinc-air battery having electrodes which are rotated so as to control dendrite growth.

The teachings of the foregoing publications are incorporated herein by reference.

SUMMARY OF THE INVENTION

The present invention seeks to provide an improved, rechargeable, electrical power storage system having one or more metal-air cells each containing a volume of a slurry containing an electrolyte solution and a volume of active metal particles enclosed in the cell so as to form a static bed through which additional electrolyte solution is circulated. A particular advantage of this system is that the quantity of electrolyte and of active metal particles required to be contained by the system is considerably smaller than that required by prior art metal-air systems employing a slurry. Accordingly, the power storage capacity per unit weight of the overall system is much higher in the system of the present invention than in prior art systems.

A further aim of the present invention is to provide an electrically powered vehicle utilizing the improved rechargeable power storage system of the invention.

Yet a further aim of the present invention is to provide improved, rechargeable, electrical power storage apparatus which receives power from a utility and, when required, provides power thereto. The power storage apparatus may also be used for recharging electric vehicles.

There is provided, therefore, in accordance with an embodiment of the invention, a rechargeable electrical power storage system employing an electrical power storage medium in the form of a slurry containing active metal particles and an electrolyte solution. The system includes one or more metal-air cells, each having outer electrode apparatus including air electrode apparatus and to define a liquid permeable housing; a volume of the active metal particles arranged within the housing so as to define a liquid permeable static bed, which is saturated with the electrolyte solution; and inner electrode apparatus arranged within the housing so as to be surrounded by the static bed. The system also includes apparatus for causing flow of the electrolyte solution through the housing and the static bed.

In accordance with a further embodiment of the invention, there is provided electrically powered transport apparatus including an electrically powered vehicle having vehicle drive apparatus; and rechargeable electrical power storage apparatus, coupled to the vehicle drive apparatus. The power storage apparatus employs an electrical power storage medium in the form of a slurry containing active metal particles and an electrolyte solution. The power storage apparatus includes one or more metal-air cells, each having outer electrode apparatus including air electrode apparatus and being configured to define a liquid permeable housing; a volume of the active metal particles arranged within the housing so as to define a liquid permeable static bed which is saturated with the electrolyte solution; and inner electrode apparatus arranged within the housing so as to be surrounded by the static bed. There is also provided apparatus for causing flow of the electrolyte solution through the housing and the static bed.

In accordance with yet a further embodiment of the invention, there is provided an electrical energy system including an electric utility having electricity generation apparatus and distribution lines; a plurality of electric vehicles, each having vehicle drive apparatus; a plurality of rechargeable electrical power storage units, each coupled to the vehicle drive apparatus of one of the electric vehicles, and employing an electrical power storage medium in the form of a slurry containing active metal particles and an electrolyte solution; and electrical power storage apparatus receiving electrical power from the electric utility and supplying electrical power to each of the rechargeable electrical power storage units and to the electric utility, when required. Each rechargeable electrical power storage unit has one or more metal-air cells, each including outer electrode apparatus including air electrode apparatus and being configured to define a liquid permeable housing; a volume of the active metal particles arranged within the housing so as to define a liquid permeable static bed which is saturated with the electrolyte solution; and inner electrode apparatus arranged within the housing so as to be surrounded by the static bed. There os also provided apparatus for causing flow of the electrolyte solution through the housing and the static bed.

Further in accordance with an embodiment of the invention, the apparatus for causing flow of the electrolyte solution through the housing and the static bed includes apparatus for pumping the electrolyte solution therethrough.

Additionally in accordance with an embodiment of the invention, there is provided apparatus for replacing the volume of the active metal particles and the electrolyte solution with a fresh volume of the active metal particles and fresh electrolyte solution, respectively, thereby recharging the one or more cells.

Further in accordance with an embodiment of the invention, a discharge product forms within the slurry upon electrical discharge thereof, and the electrolyte solution is selected to react with the solid discharge product so as to cause dissolution thereof.

Additionally in accordance with an embodiment of the invention, the apparatus for causing flow includes apparatus for removing electrolyte solution from the one or more cells; electrolyte solution storage apparatus located externally of the one or more cells; apparatus for providing electrolyte solution to the one or more cells from the electrolyte solution storage apparatus; and apparatus for providing the electrolyte solution removed from the one or more cells to the electrolyte solution storage apparatus, including apparatus for resupplying the removed electrolyte solution to the one or more cells.

According to a preferred embodiment of the invention, there is also provided apparatus for removing the dissolved discharge product from the electrolyte solution downstream of the one or more cells.

Additionally according to a preferred embodiment of the invention, the apparatus for removing includes apparatus for receiving electrolyte solution containing the dissolved discharge product; and apparatus, associated with the apparatus for receiving, for causing precipitation of the dissolved discharge product into a solid.

Further according to a preferred embodiment of the invention, the apparatus for removing also includes apparatus for resupplying electrolyte solution from which dissolved discharge product has been removed to the apparatus for causing flow, and apparatus for preventing the reentry of the precipitated solid into the resupplied electrolyte solution.

In accordance with a further embodiment of the invention, there is provided a method of extending the useful life of a rechargeable, electrical, metal-air, power storage system employing an electrical power storage medium in the form of a slurry containing active metal particles and an electrolyte solution, the method including the steps of enclosing a volume of the active metal particles in operative association with one or more air electrodes associated with a first current collector, thereby providing a static bed of the active metal particles; saturating the static bed of active metal particles with electrolyte solution; arranging a second current collector in operative association with the saturated static bed; and causing a flow of the electrolyte solution through the static bed, thereby prolonging the useful life of the power storage system.

Additionally in accordance with the present embodiment of the invention, a solid discharge product forms within the slurry upon electrical discharge thereof, and the step of causing flow includes the step of causing the flow of an electrolyte solution selected to react with the solid discharge product so as to cause dissolution thereof.

Further in accordance with the present embodiment of the invention, the step of causing flow includes the steps of removing electrolyte solution from the static bed; providing electrolyte solution to the static bed from electrolyte solution storage apparatus; and providing the electrolyte solution removed from the static bed to the electrolyte solution storage apparatus, so as to resupply the removed electrolyte solution to the static bed.

Additionally in accordance with the present embodiment of the invention, the method also includes the step of removing the dissolved discharge product from the electrolyte solution downstream of the static bed.

Further in accordance with the present embodiment of the invention, the step of removing includes the steps of receiving electrolyte solution containing the dissolved discharge product, and precipitating the dissolved discharge product into a solid.

Additionally in accordance with the present embodiment of the invention, the step of removing further includes the steps of resupplying electrolyte solution from which dissolved discharge product has been removed to the static bed, and preventing the re-entry of the precipitated solid into the resupplied electrolyte solution.

BRIEF DESCRIPTION OF THE DRAWINGS

The present invention will be understood and appreciated more fully from the following detailed description, taken in conjunction with the drawings in which:

FIG. 1B is a schematic, detailed illustration of the de-solubilizing apparatus of FIG. 1A, constructed in accordance with a preferred embodiment of the invention;

DETAILED DESCRIPTION OF THE INVENTION

Figure 1A:
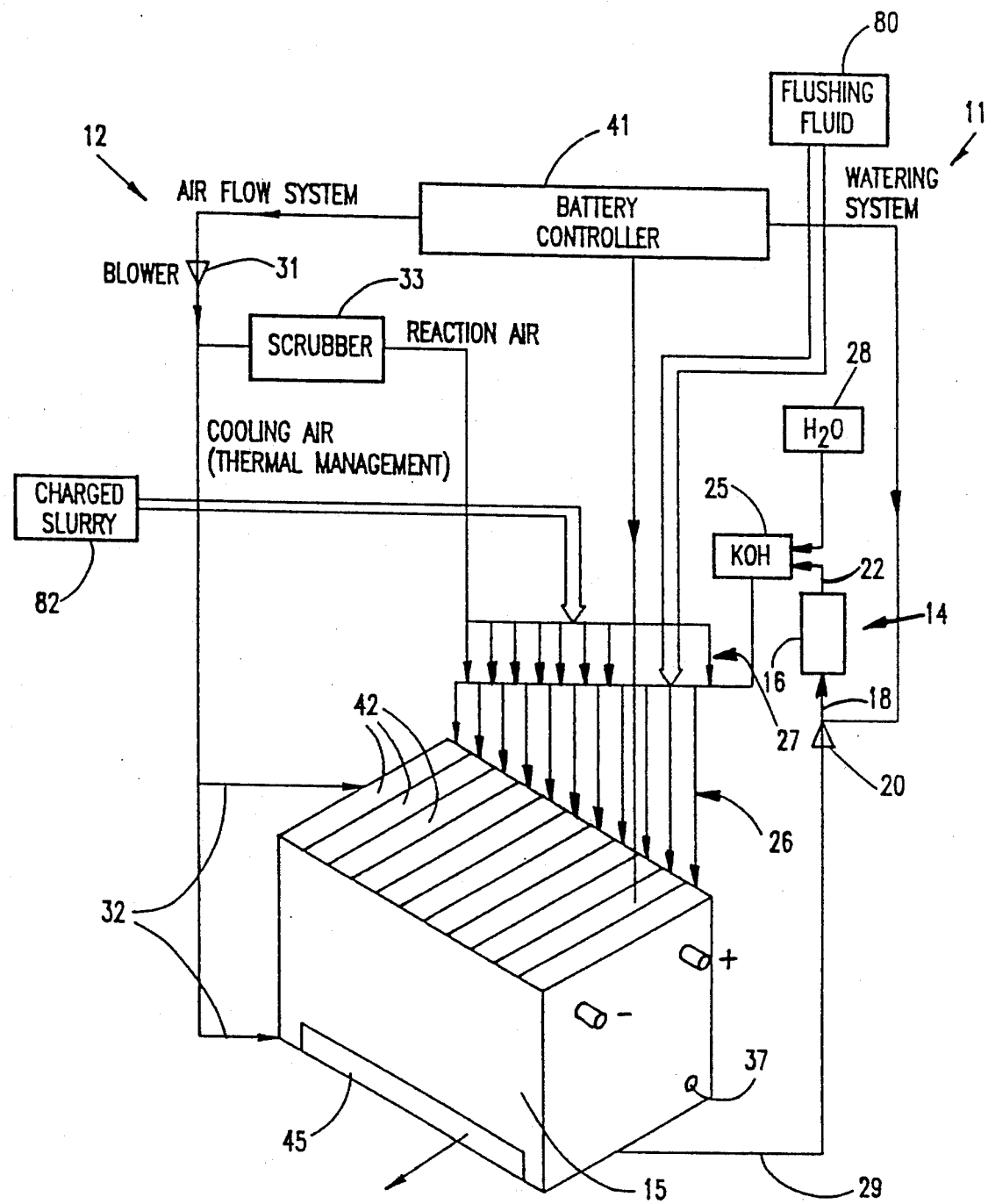
FIG. 1A is a block diagram illustration of an electrical power storage system suitable for powering an electric vehicle.

Reference is now made to FIG. 1A which is a block diagram illustration of an electrical power storage system suitable for powering an electric vehicle, constructed and operative in accordance with the present invention. The system includes a multi-cell, rechargeable, metal-air battery 15, containing a slurry of active metal particles and an electrolyte solution, and which is suitable for powering an electric vehicle, such as shown and described below in conjunction with FIGS. 5–8C. Battery 15 includes a plurality of serially-connected cells 42, the precise structure of which is described below in detail in conjunction with FIGS. 2–4.

Typically, battery 15 is specifically a zinc-air battery employing a slurry containing a mixture of zinc particles, alkaline potassium hydroxide solution and/or sodium hydroxide solution.

As described in the Background of the Invention, a problem with zinc-air batteries is the formation of zinc oxide during the electrical discharge of the battery.

In order to reduce the amount of zinc oxide in the slurry and thus prolong the useful life of the battery, the system of the present invention, as represented schematically in FIG. 1A, includes a "watering" system, referenced generally 11, for circulating an electrolyte solution through a "static bed" of the zinc particles contained in each of the individual battery cells 42. The static bed arrangement of the zinc particles is described in greater detail below in conjunction with FIG. 3.

There is also provided an air flow system, referenced generally 12, whose function is described hereinbelow.

Watering system 11 may also include "de-solubilizing" apparatus 14, shown in detail in FIG. 1B, for removing dissolved zinc oxide from the circulating electrolyte downstream of battery 15.

Watering system 11 includes a reservoir 25 for an electrolyte solution, such as KOH and/or NaOH, with optional additives LiOH, sorbitol, silicon dioxide (that may also be present in the cell electrolyte), for example, a manifold 26, associated with battery 15, and a pump 20, which is operative to pump electrolyte from battery 15 to reservoir 25, thereby also causing the circulation of electrolyte from reservoir 25 to battery 15, via manifold 26. Water may be added to the electrolyte solution stored in reservoir 25, from a further reservoir, referenced 28.

The zinc oxide formed in the static bed of active metal particles in each cell 42 is dissolved by the pumped circulation therethrough of the electrolyte solution. Circulated electrolyte containing dissolved zinc oxide exits battery 15 via an outlet conduit 29, and is recirculated by pumping apparatus 20.

A typical volumetric flow rate at which the electrolyte solution may be circulated through cells 42 is in the range 0.01-0.2 ml per minute per Ampere hour. Although the concentration of dissolved zinc oxide in the electrolyte increases as the battery continues to be electrically discharged, the volume of electrolyte circulated through the battery is selected such that the performance of the battery is maintained at at least a predetermined level.

It will be appreciated that the flow rate at which the electrolyte is circulated is lower the flow rates of prior art systems in which either an electrolyte solution only, or an entire slurry suspension, is circulated. The system of the present invention furthermore has an electrolyte requirement typically in the range 2-4 cc/Ahr, whereas a conventional metal-air system typically has an electrolyte requirement in the range of 5-15 cc/Ahr.

Accordingly, a particular advantage of the present system is that the quantity of electrolyte and of active metal particles required to be contained by the system is considerably smaller than than required by prior art metal-air systems employing a slurry. A battery constructed in accordance with the present invention typically has an energy density in the range 100-150 WH/Kg, compared with a much lower energy density of only 60-80 WH/Kg of conventional metal-air batteries.

Referring now particularly to FIG. 1B, de-solubilizing apparatus 14 comprises a flow-through housing 16 having an inlet 18 and an outlet 22. Contained within housing 16, preferably in a removable element, such as in the form of a tray 17, is a precipitation material, indicated generally at 24, which, when electrolyte containing dissolved zinc oxide flows in contact therewith, causes precipitation of the dissolved zinc oxide into solid form.

Precipitation material 24 is typically retained between a pair of fine mesh filter elements, indicated schematically at 34 and 35, which also serve to prevent the washing through of the precipitated zinc oxide, while permitting the flow through the housing of the recirculated electrolyte. Tray 17 is configured for slidable insertion and removal, as indicated by respective arrows 36 and 38, via suitable tracks 39, and is also provided with suitable sealing means, such as a gasket 41, so as to prevent leakage of electrolyte from the housing 16.

It will be appreciated that the removal of tray 17 facilitates replacement of a batch of used up or zinc oxidesaturated precipitation material with a fresh batch of precipitation material.

According to one embodiment, the precipitation material reacts with the dissolved zinc oxide contained in the recirculated electrolyte solution so as to precipitate into zinc oxide. Typical suitable reactants are calcium hydroxide, barium hydroxide and strontium hydroxide.

If the metal-air system of the invention is an aluminum-air system wherein the active metal particles in the slurry are aluminum based, the precipitation material could be aluminum hydroxide.

According to an alternative embodiment of the invention, the precipitation material is a nucleation site material, such as may be constituted by any suitable fibrous, porous or absorbent material. Typical suitable nucleation site materials are cellulose fibers, titania, zirconia, porous polyamide, porous polypropylene, kaolin and kieselguhr.

Figure 9A:
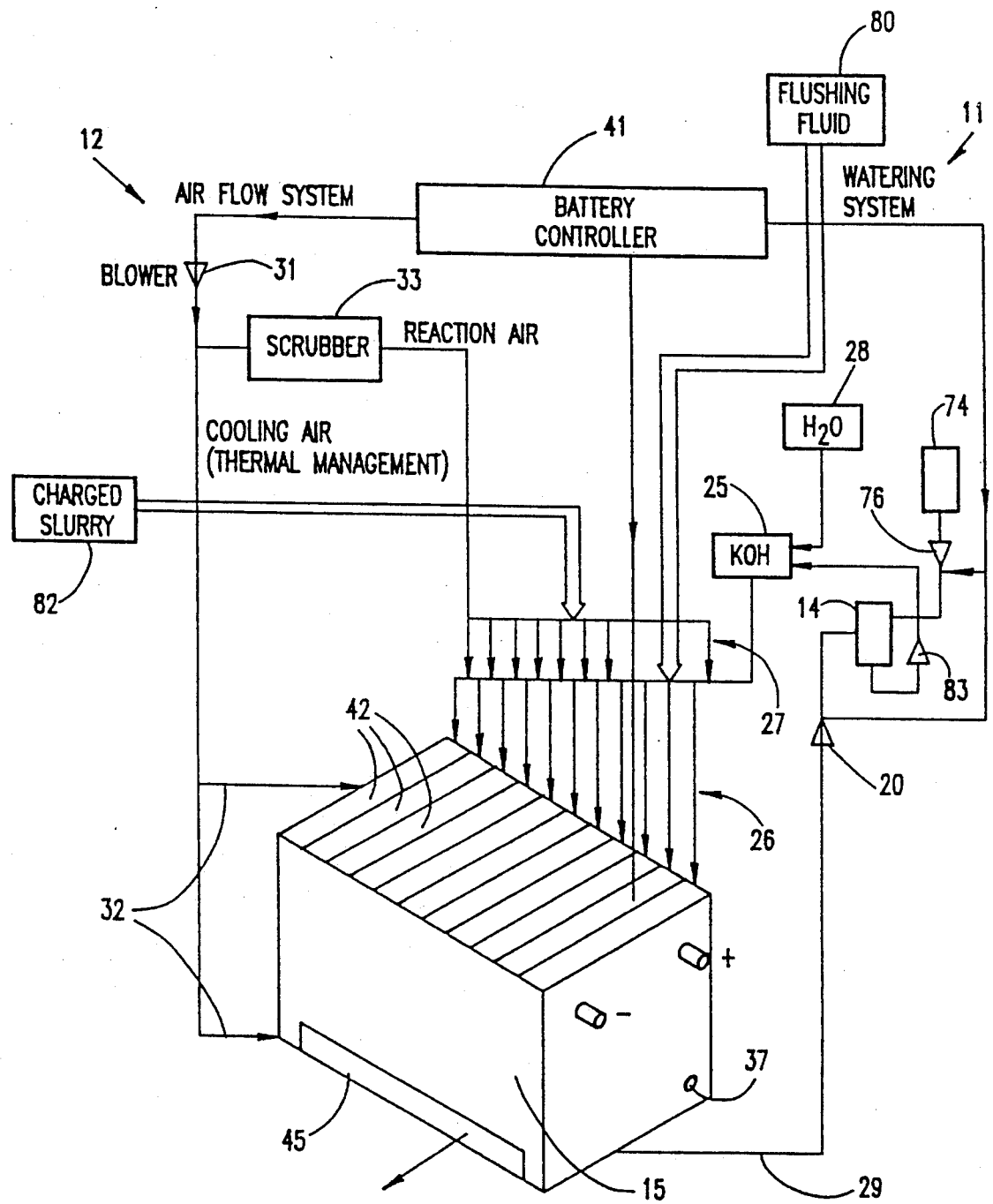
FIG. 9A is a block diagram illustration of an electrical power storage system constructed in accordance with an alternative embodiment of the invention.

Reference is now made to FIG. 9A, which is a block diagram illustration of a system similar to that shown and described above in conjunction with FIG. 1A, except wherein desolubilizing apparatus 14 is constructed and operative according to an alternative embodiment of the invention.

Figure 9B:
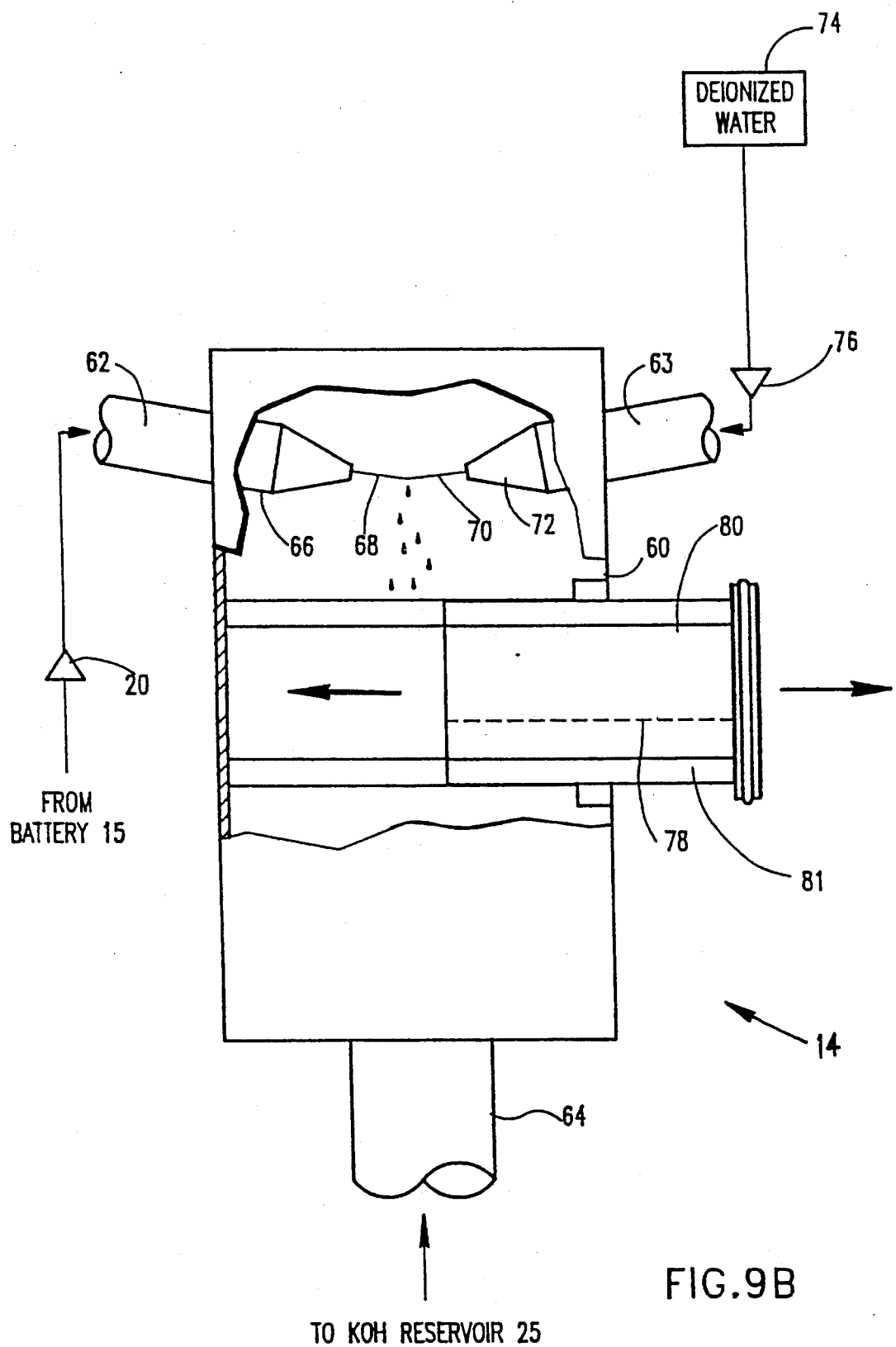
FIG. 9B is a schematic, detailed illustration of the de-solubilizing apparatus of FIG. 9A.

Referring now particularly to FIG. 9B, according to the present embodiment, apparatus 14 includes a flow-through housing 60 having an inlet 62 and an outlet 64. A first nozzle 66 is mounted in the housing so as to have a line of sight 68 intersecting with the line of sight 70 of a second nozzle 72.

Although only a single first nozzle 66 and a single second nozzle 72 are indicated in FIG. 9B, this is by way of example only, and it is not intended to indicate the actual number of nozzles that may be used in a particular system. Rather, reference to a single nozzle is intended to infer one or more similar nozzles, it being envisaged that any number of nozzles may be employed in any particular system constructed according to the teachings of the present invention.

In the present example, therefore, first nozzle 66 is operative to receive from battery 15 (FIG. 9A) and via pump 20 a pressurized supply of circulated electrolyte containing dissolved zinc oxide that it is sought to remove from solution. Second nozzle 72 is operative to receive from a reservoir 74, via a suitable pump 76, a pressurized supply of deionized water. The nozzles are arranged, as described, such that their respective lines of sight intersect.

When their respective pumps are operated, so as to direct towards each other a stream of droplets of deionized water and a stream of droplets of the electrolyte solution containing dissolved zinc oxide, solid zinc oxide is formed, so as to be deposited onto a mesh element 78, mounted in a removable tray-like element 80, similar to element 17 described above in conjunction with FIG. 1A. The remaining electrolyte solution is permitted to pass through the mesh element 78 and is recirculated to reservoir 25 (FIG. 9A) as by means of a pump 83.

Although the addition of deionized water causes dilution of the electrolyte solution being circulated through the battery cells, this is substantially offset by the evaporation of water from the cells.

It will be appreciated that according to the embodiment of the invention wherein watering system 11 incorporates desolubilizing apparatus 14, as described above in conjunction with either of FIGS. 1B or 9B, a smaller overall volume of electrolyte is required to extend the life of battery 15 for a given amount of usage, than in the embodiment wherein apparatus 14 is not incorporated.

With further reference to FIG. 1A, the air flow system 12 includes a blower 31 for circulating cooling air for the battery 15, via parallel conduits 32, and reaction air for the battery via a scrubber 33. The reaction air for the battery is passed through scrubber 33 in order to remove from the air deleterious acidic gases such as carbon dioxide. The reaction air is distributed to the battery cells 42 via a manifold 27, and exits the battery through an outlet port 37, through which the cooling air also exits the battery.

Operation of the watering system 11 and of the air flow system 12 is governed by a battery controller 41. In particular, the battery controller 41, which may be based on any suitable microcontroller, operates pumping apparatus 20 and blower 31 so as to maintain predetermined operating conditions of the battery.

Battery 15 is mechanically rechargeable. Once it has become electrically discharged, it is recharged by removing the discharged slurry from cells 42 through a slurry outlet 45, flushing the cells 42 with a suitable fluid, typically KOH or water, supplied from an offboard flushing fluid reservoir 80, and refilling with a charged batch of slurry from charged slurry storage facility, referenced 82.

The flushing fluid may be supplied, for example, via manifold 26, while the charged slurry may be supplied via a manifold (not shown), which may be of any suitable construction, such as described and shown in U.S. Pat. No. 3,847,671, entitled Hydraulically-Refuelable Metal-Gas Depolarized Battery System, the contents of which are incorporated herein by reference. Typically, the electrolyte solution in reservoir 25 is also replaced with a fresh volume of electrolyte, and the water in reservoir 28 is refilled.

It will be appreciated by persons skilled in the art that, watering system 11 is operative to render the electrical power storage system more economical by extending the functional life of the slurry so as to decrease the frequency of the required replenishment thereof.

As described above, when the system of the invention is a zinc-air system, the circulation of a potassium hydroxide solution through the cells 42 is operative to remove discharged zinc oxide in solution.

It will be appreciated that the circulation of an electrolyte solution through a static bed of active metal particles is advantageous not only in a zinc-air system, but in other metal-air systems as well, such as aluminum-air and iron-air systems.

A known phenomenon of metal-air cells is that of heat generation and, consequently, the drying out of the slurry. Reservoir 25 (FIG. 1A) is located externally of the cells 42, and can be maintained, therefore, at a temperature lower than that of the cells 42. Accordingly, the provision of a liquid solution from relatively cool reservoir 25 and the circulation of the solution through the battery cells is operative to remove excess heat therefrom, thereby aiding in heat management of the battery. Drying out of the slurry is also prevented by the supply of water from reservoir 28 as described above.

Additional metal-air systems in which it may be useful to circulate a liquid solution, typically an aqueous electrolyte solution, are aluminum-air and iron-air systems. In both of these systems circulation of such a solution helps to remove undesired excess heat from the cells, while in an aluminum-air system, the circulation of a liquid helps prevent drying out of the aluminum based slurry.

It will be appreciated that where de-ionized water is used to obtain precipitation of the dissolved zinc oxide, as described above in conjunction with FIGS. 9A and 9B, the relatively cool temperature of the de-ionized water helps to dissipate the heat from the electrolyte solution which is itself operative to remove excess heat from the cells 42, as described above.

Additionally, liquid reservoir 25 may contain a KOH solution and/or an NaOH solution, for example, and suitable additives, selected to increase the solubility of the solid byproducts within the slurry, may also be added to the solution. Suitable additives may be silicon dioxide, sorbitol, or lithium hydroxide, for example. These additives may also be present in the cell electrolyte.

Figure 2:
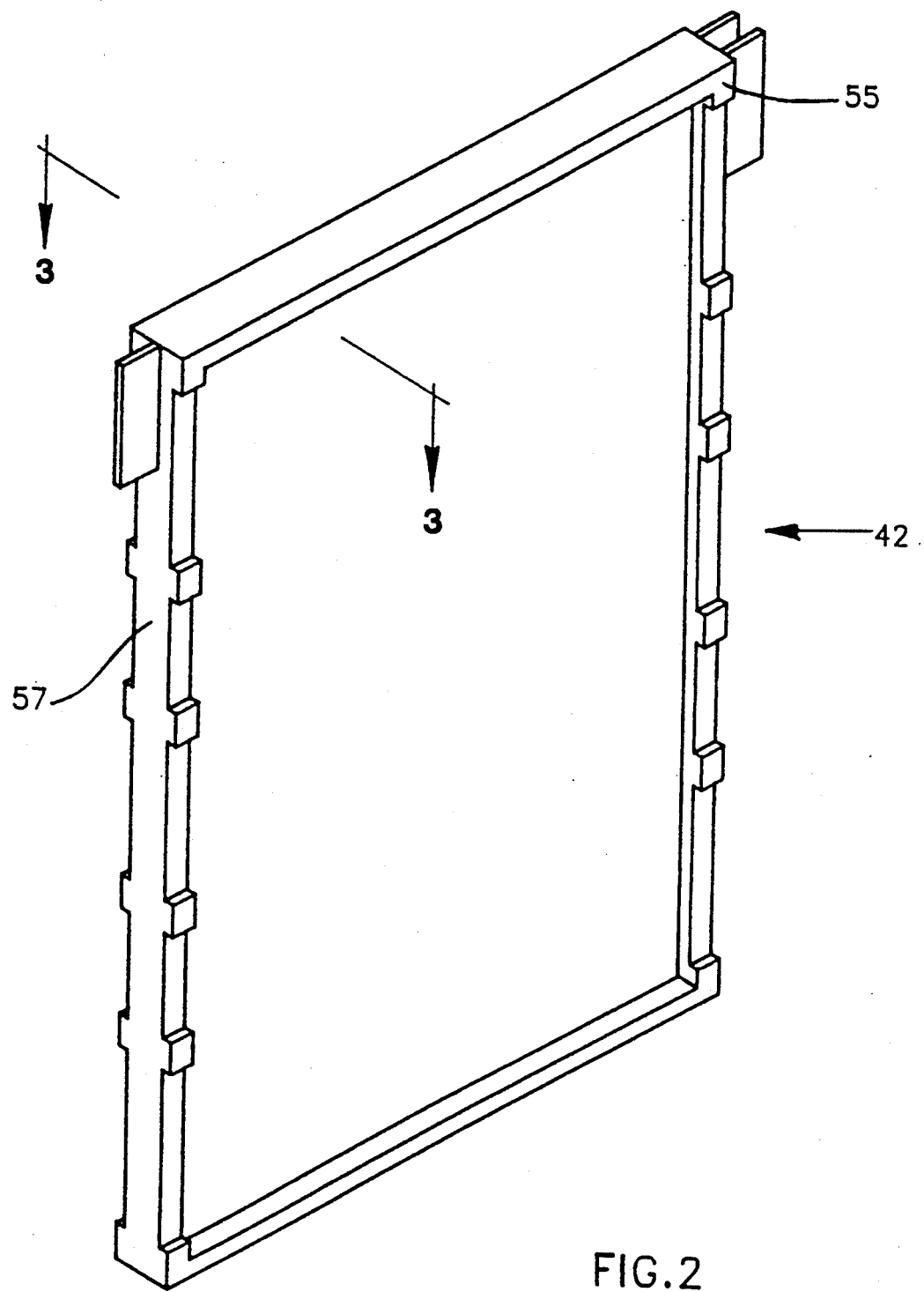
FIG. 2 is a pictorial illustration of a single cell of the multi-cell battery illustrated in FIG. 1.

FIG. 2 is a pictorial representation of a single battery cell 42, whose construction is described in detail hereinbelow with reference to FIGS. 3 and 4.

Figure 3:
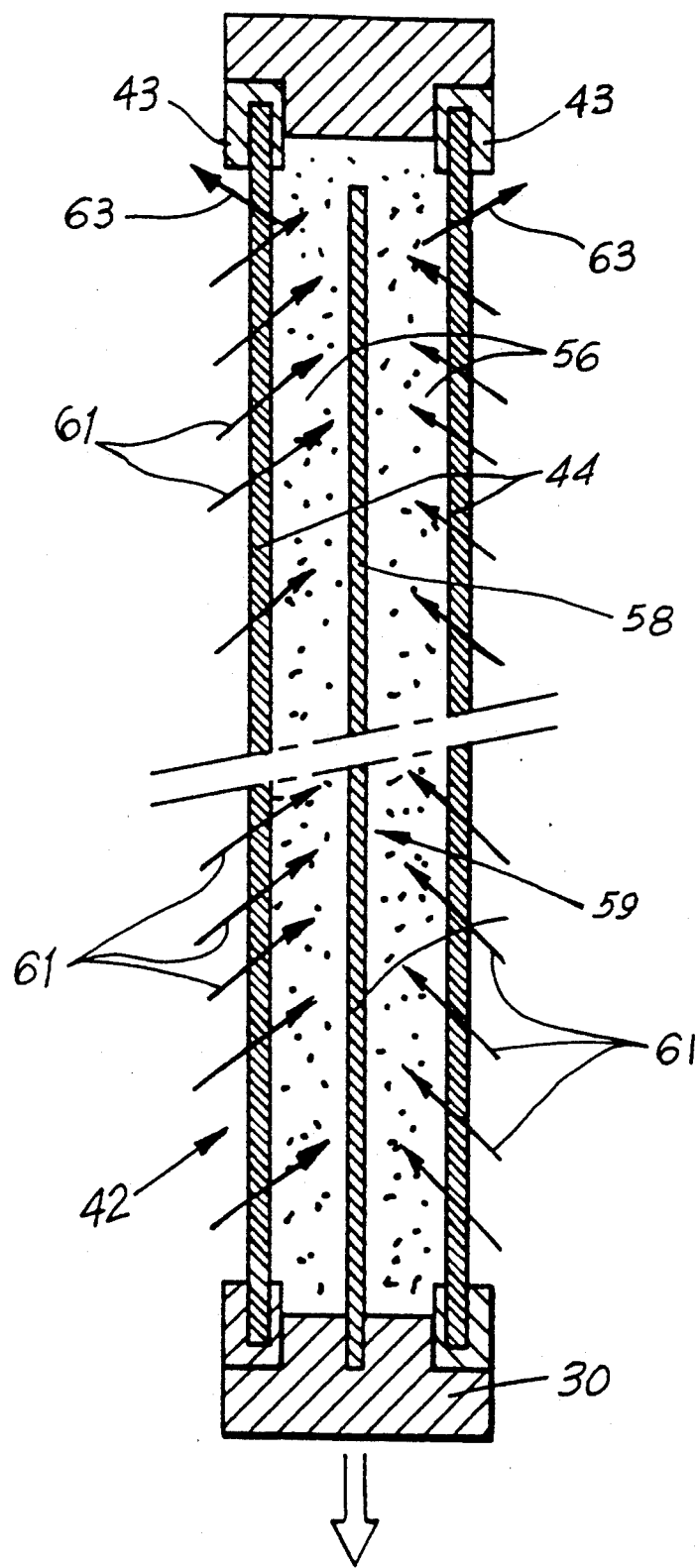
FIG. 3 is a cross-sectional schematic view of the battery cell illustrated in FIG. 2, taken along line 3—3 therein.
Figure 4:
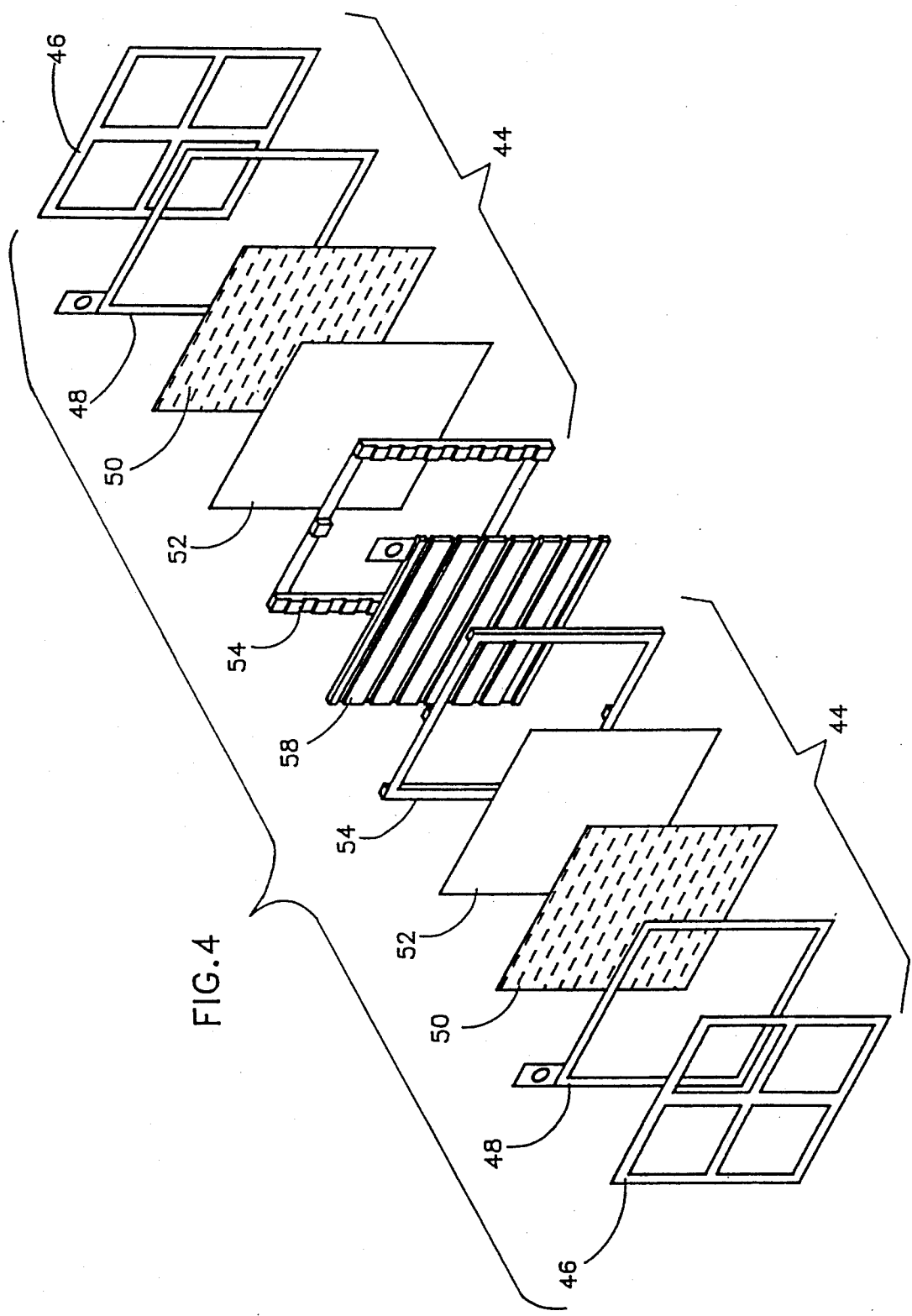
FIG. 4 is an exploded view illustration of the single battery cell illustrated in FIG. 2.

Referring now to FIGS. 3 and 4, battery cell 42 includes a pair of frame members 43 (FIG. 3), typically formed of polypropylene, each supporting an associated outer electrode unit 44.

Referring now more particularly to FIG. 4, each outer electrode unit includes an outer support frame 46, typically formed of polypropylene; an outer current collector 48, typically formed of nickel mesh; a gas electrode 50, typically an air electrode formed of a wet-proofed, catalyzed carbon layer formed on the nickel mesh; a normal separator 52, formed typically of nonwoven porous nylon, for preventing contact between the metal particles in the slurry and the gas electrode; and an inner support frame 54, similar to outer support frame 46.

In assembled form, as illustrated in FIGS. 2 and 3, top and side sealing members, referenced respectively 55 and 57 (FIG. 2), cooperate with frame members 43 (FIG. 3) which support outer electrode units 44 so as to define an interior space, referenced generally 59 (FIG. 3), for storing a power storage slurry, such as described above, indicated generally by reference numeral 56 (FIG. 3).

A central current collector 58 is mounted within the interior space 59 of the battery cell so as to be immersed in, and thus in electrically conductive contact with the slurry. The central current collector 58 is typically connected to a base member 30 which is secured to frame members 43 (FIG. 3).

Figure 5:
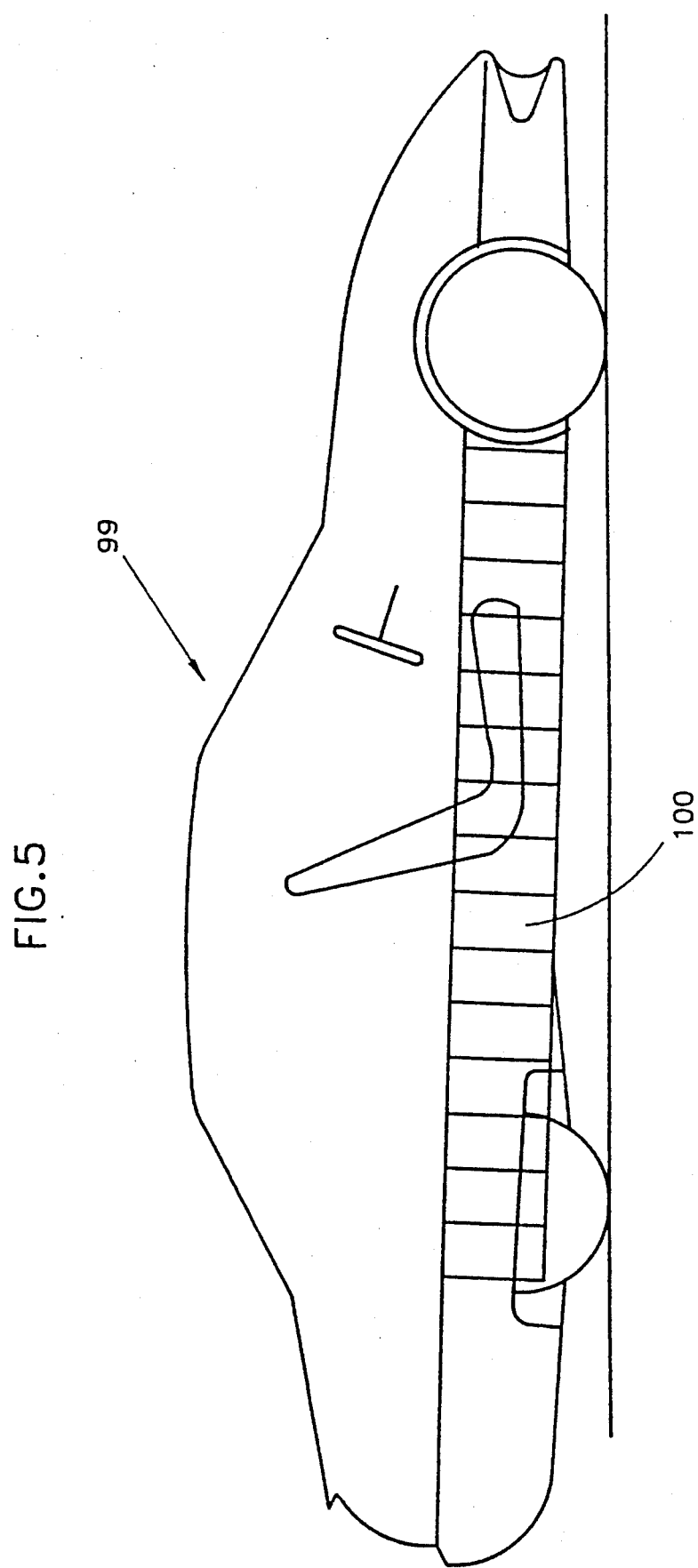
FIG. 5 is a general schematic illustration of an electric vehicle employing the system of FIG. 1.

Reference is now made to FIG. 5, which illustrates a typical electric car 99, including a zinc-air battery system 100, such as either of the systems described and shown hereinabove in conjunction with FIGS. 1A or 9A. The car 99 and battery system 100 are preferably constructed so as to facilitate replacement of spent slurry by charged slurry at the battery recharging subsystem shown and described below in conjunction with FIG. 12.

Figure 6:
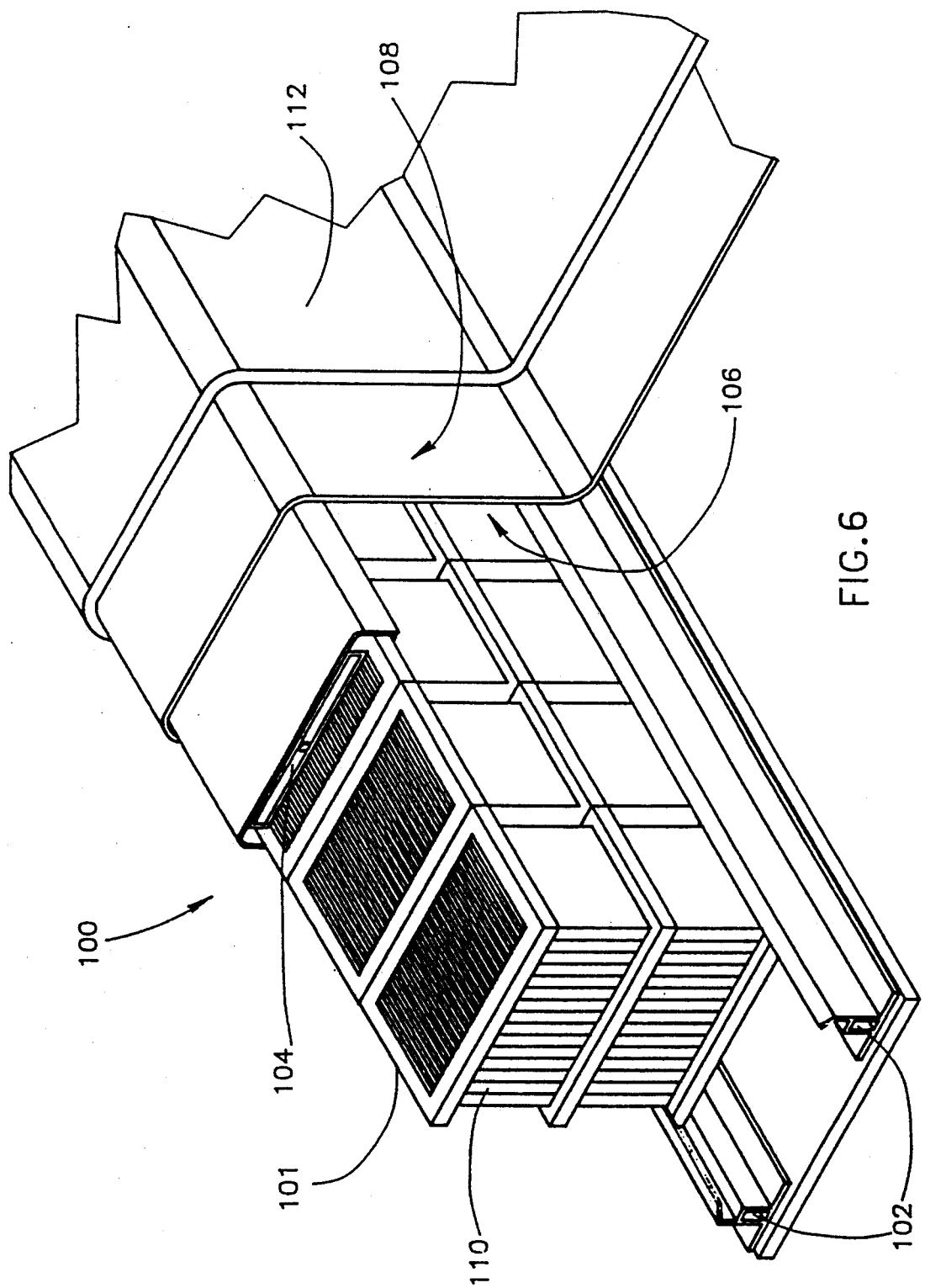
FIG. 6 is a partially cut away illustration of the installation of a zinc-air battery in a vehicle of the type illustrated in FIG. 5.

Referring now also to FIG. 6, a zinc-air battery 101 forming part of system 100, is typically located centrally along the longitudinal axis of the car 99 (FIG. 5) and is mounted on frame rails 102. Provision is made for distilled water and/or electrolyte supply tubes 104 and a scrubbed air flow channel 106 within an air tight enclosure 108, which surrounds the battery cells 110.

Enclosure 108 is typically covered by thermal and acoustic insulation 112. The structure of the individual battery cells is substantially as described above in conjunction with any of FIGS. 2–4 hereinabove.

Figure 7:
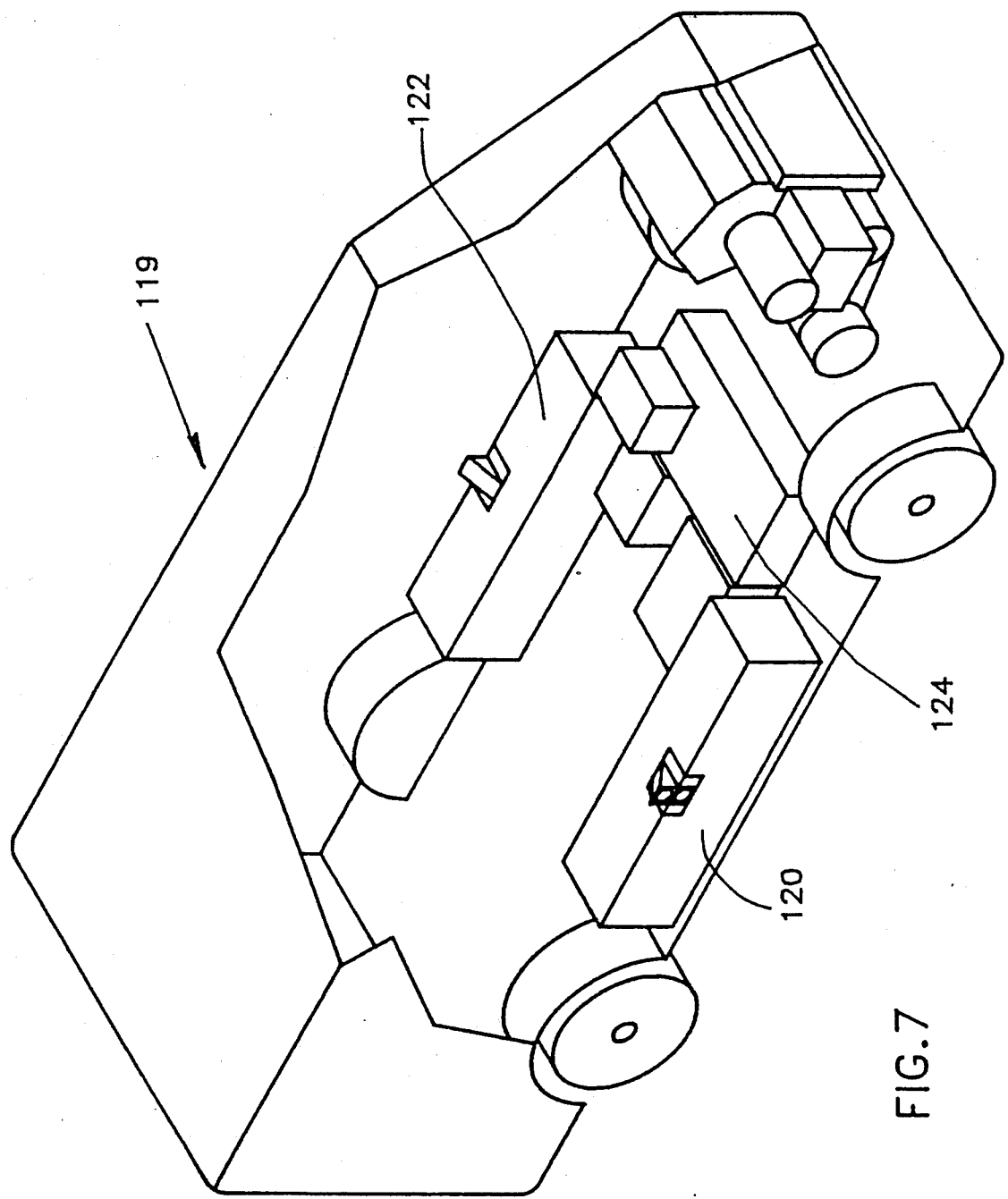
FIG. 7 is a general schematic illustration of an electric vehicle, different to that of FIG. 5, also employing the system of FIG. 1.
Figure 8C:
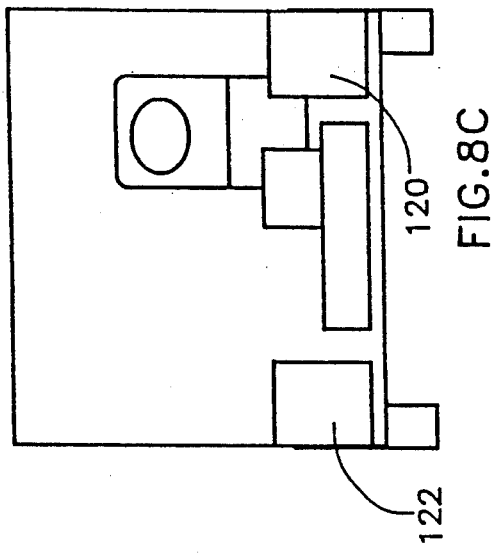
FIGS. 8A, 8B and 8C are respective side, top and end view schematic illustrations of the vehicle of FIG. 7, illustrating the general location of major operating systems therein.
Figure 8A:
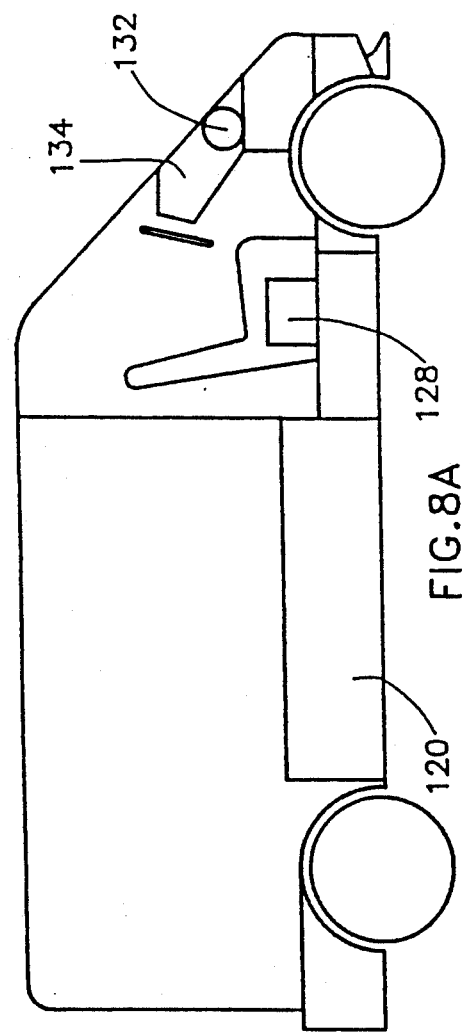
Figure 8B:
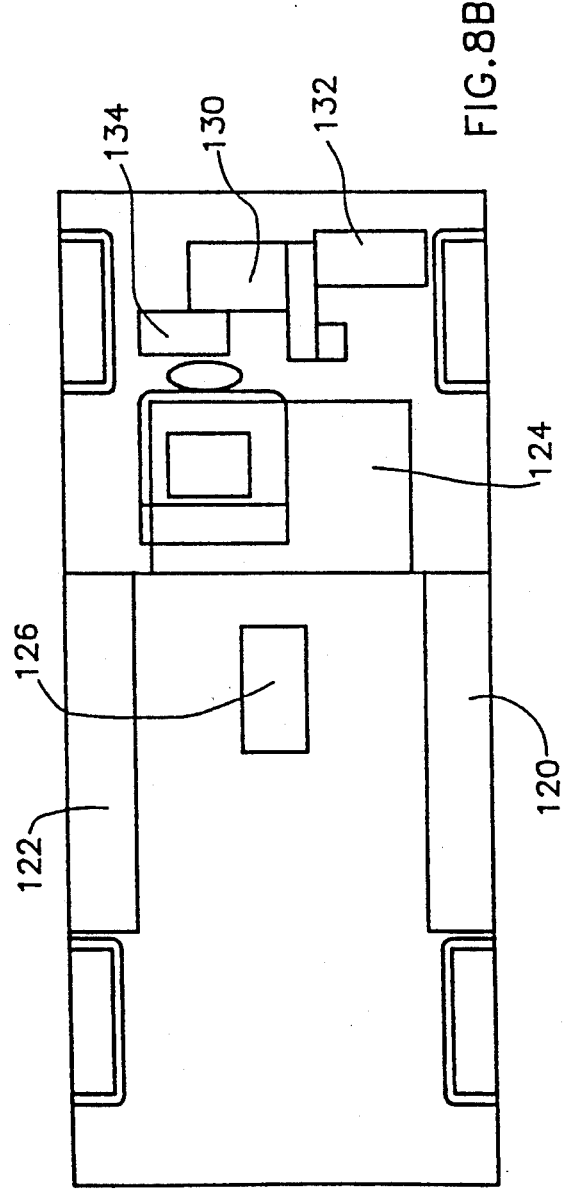

Reference is now made to FIGS. 7–8C which illustrate the general configuration of an electric van 119 useful in the present invention. As seen in FIG. 7, the van is provided with two zinc-air battery banks 120 and 122 on opposite sides of the body. The van 119 and battery banks 120 and 122 are preferably constructed so as to facilitate replacement of spent slurry by charged slurry at the battery recharging subsystem shown and described below in conjunction with FIG. 12. An auxiliary lead-acid battery 124 is preferably provided in addition. A power switching system 126 (FIG. 8B) governs the supply of power to and from the various batteries.

FIGS. 8A–8C also illustrate preferred locations of a 12 volt vehicle auxiliary battery 128, a traction motor and drive 130 (FIG. 8B), a cabin heater 132, and a Driving Management System 134.

Figure 10:
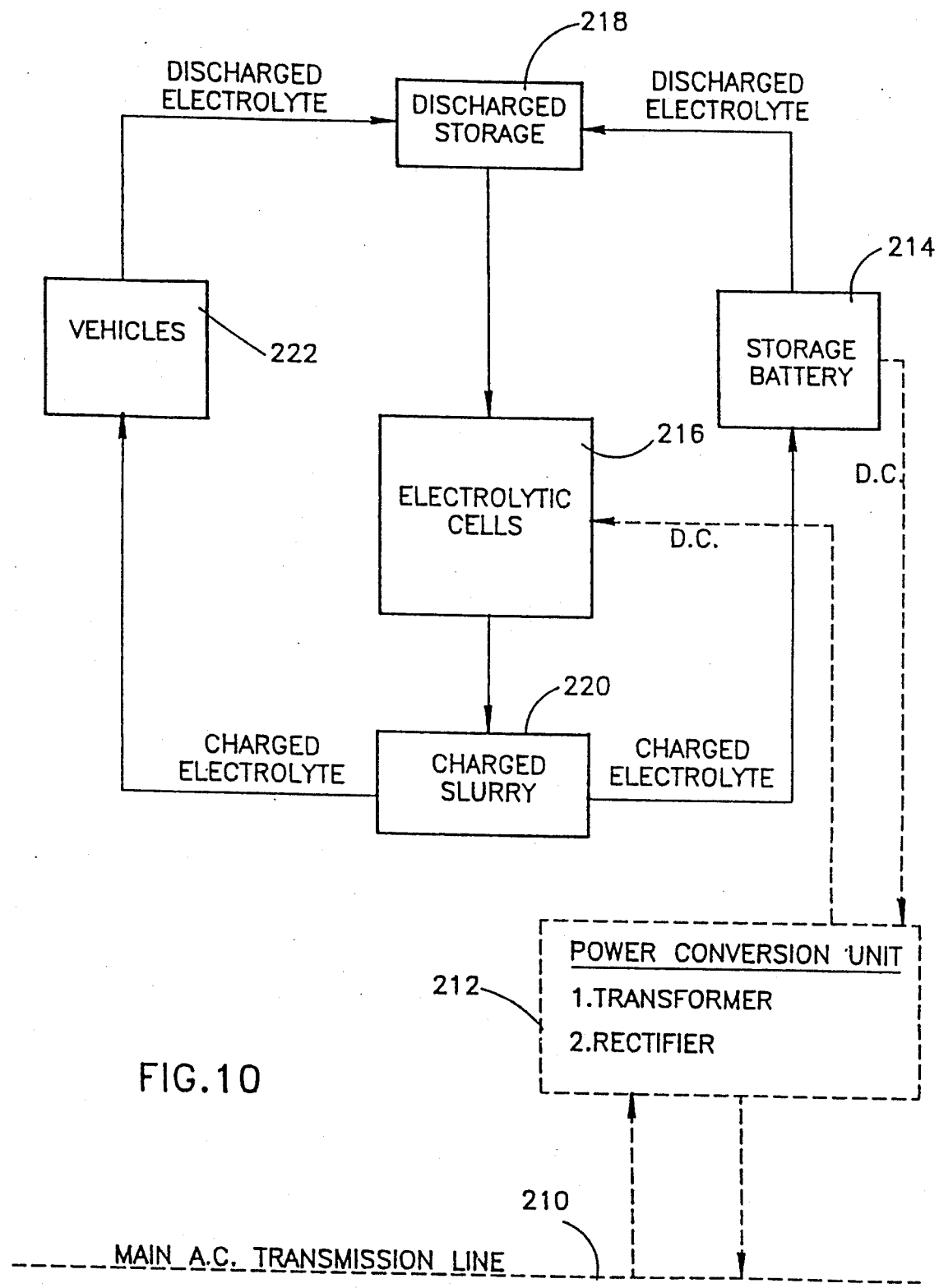
FIG. 10 is a block diagram illustration of an electrical energy system constructed and operative in accordance with a further embodiment of the present invention.

Reference is now made to FIG. 10, which illustrates in generalized block diagram form an electrical system constructed and operative in accordance with a further embodiment of the present invention and including an electrical utility having electricity generation apparatus and distribution lines, a plurality of electric vehicles, such as shown and described above in conjunction with FIGS. 5–8C, and electric power storage apparatus receiving electrical power from the electric utility and supplying electrical power to the plurality of electric vehicles and to the electric utility when required.

Illustrated in FIG. 10 is an AC transmission line 210 which is arranged for power transfer via a power conversion unit 212 with a storage battery bank 214 and with a bank of electrolytic cells 216. The electrolytic cells 216 are operative to electrically charge an energy storage slurry, similar to that employed by cells 42 (FIGS. 1–4), but following partial discharge and comprising a mixture of zinc granules, zinc oxide, and alkaline potassium hydroxide solution, thereby storing energy therein.

In the illustrated embodiment, discharged slurry is stored in a discharged slurry storage facility 218 and supplied to electrolytic cells 216 via suitable pumps (not shown). The charged slurry is received in a facility 220 and then stored in storage battery 214 or supplied to electric vehicles 222.

Discharged slurry is received at facility 218 from the electric vehicles 222 and from storage battery 214. The storage battery 214 provides, when necessary or economical, electrical power to transmission line 210 via conversion unit 212.

It will be appreciated by persons skilled in the art that the present invention, through the synergistic combination of two disparate activities, utility energy storage and electric vehicle operation, each of which is presently uneconomical, provides economical electrical utility off-peak power storage, surge protection, on-peak and super-peak demand power supply, spinning reserve and electric vehicle system.

Figure 11:
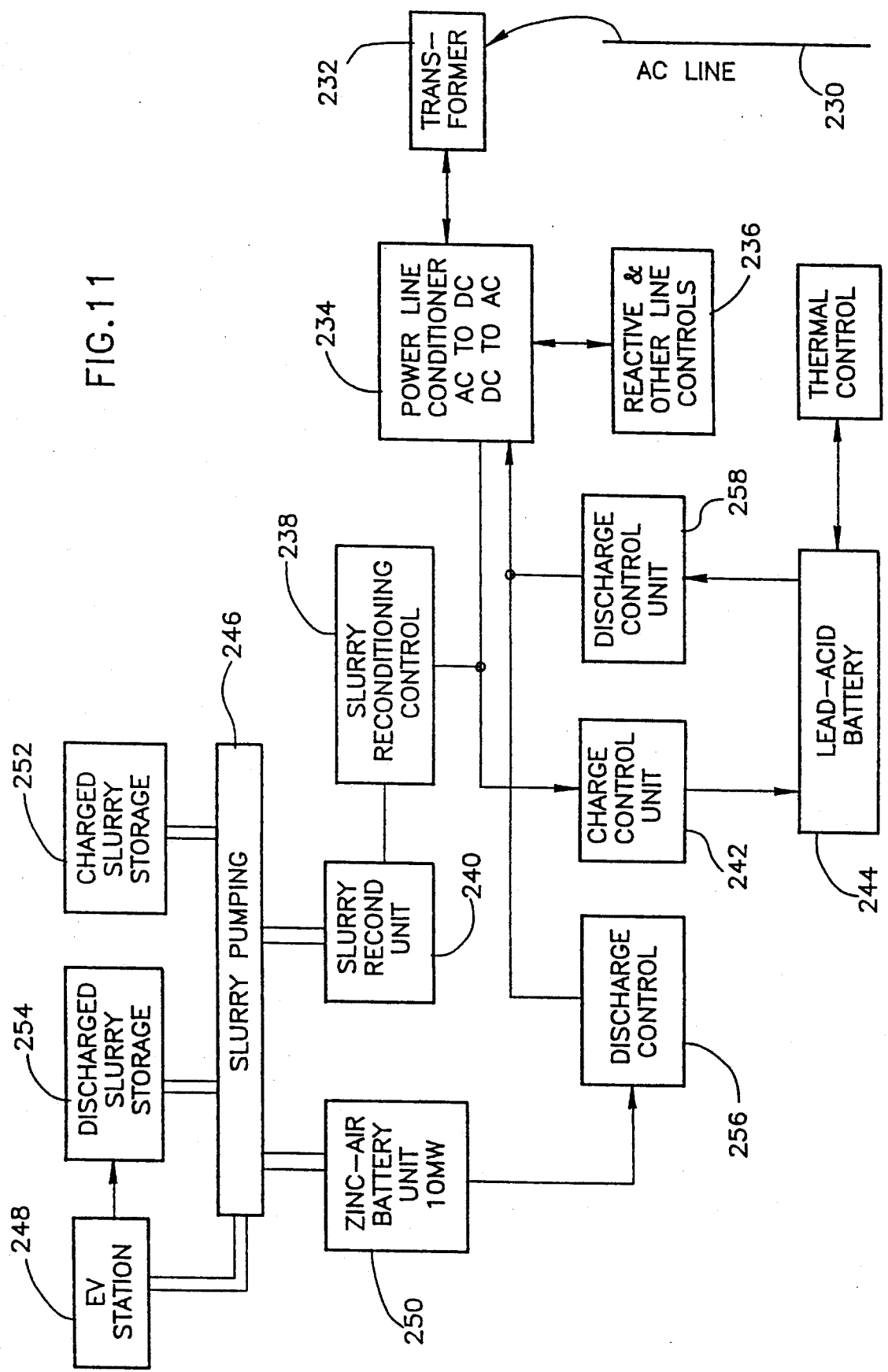
FIG. 11 is a more detailed block diagram of the system of FIG. 10.

Reference is now made to FIG. 11, which illustrates the system of FIG. 10 in greater detail. As shown in FIG. 11, the AC utility transmission line, here indicated by reference numeral 230, is coupled via a transformer 232 to a power line conditioner 234 which includes high capacity AC to DC and DC to AC converters. Reactive and other line control apparatus 236, such as peak switching-in detectors may be associated with the power line conditioner 234.

A DC output of conditioner 234 may be supplied via a slurry reconditioning control circuitry 238 to a slurry reconditioning facility 240. The DC output of conditioner 234 may also be supplied via a charge control unit 242 to a bank of lead-acid batteries 244.

Slurry reconditioning facility 240 is operative to provide charged slurry, via slurry pumping apparatus 246 to an electric vehicle refueling station 248, for supply to electric vehicles. Facility 240 is also operative to supply charged slurry via slurry pumping apparatus 246 to a zinc-air battery 250. Charged slurry from facility 240 may also be stored in a charged slurry storage tank 252.

Discharged slurry removed from electric vehicles is supplied from electric vehicle refueling station 248 to a discharged slurry storage tank 254 and is supplied at appropriate times to facility 240 by slurry pumping apparatus 246. Normally recharging of slurry is carried out by facility 240 during off-peak times for utility supplied electricity.

Electrical power may be drawn from battery 250 when needed, and supplied via discharge control circuitry 256, power line conditioner 234 and transformer 232 to the utility via power line 230. Normally power is supplied to the utility from battery 250 at times of peak power consumption.

Electrical power may be drawn from battery 244 when needed, and supplied via discharge control circuitry 258, power line conditioner 234 and transformer 232 to the utility via power line 230. Normally power transfers between battery 244 and utility power line 230 take place in order to balance the impedance of the power line 230, to absorb short term peaks and shortfalls, typically having a time constant of less than one-half hour.

Figure 12:
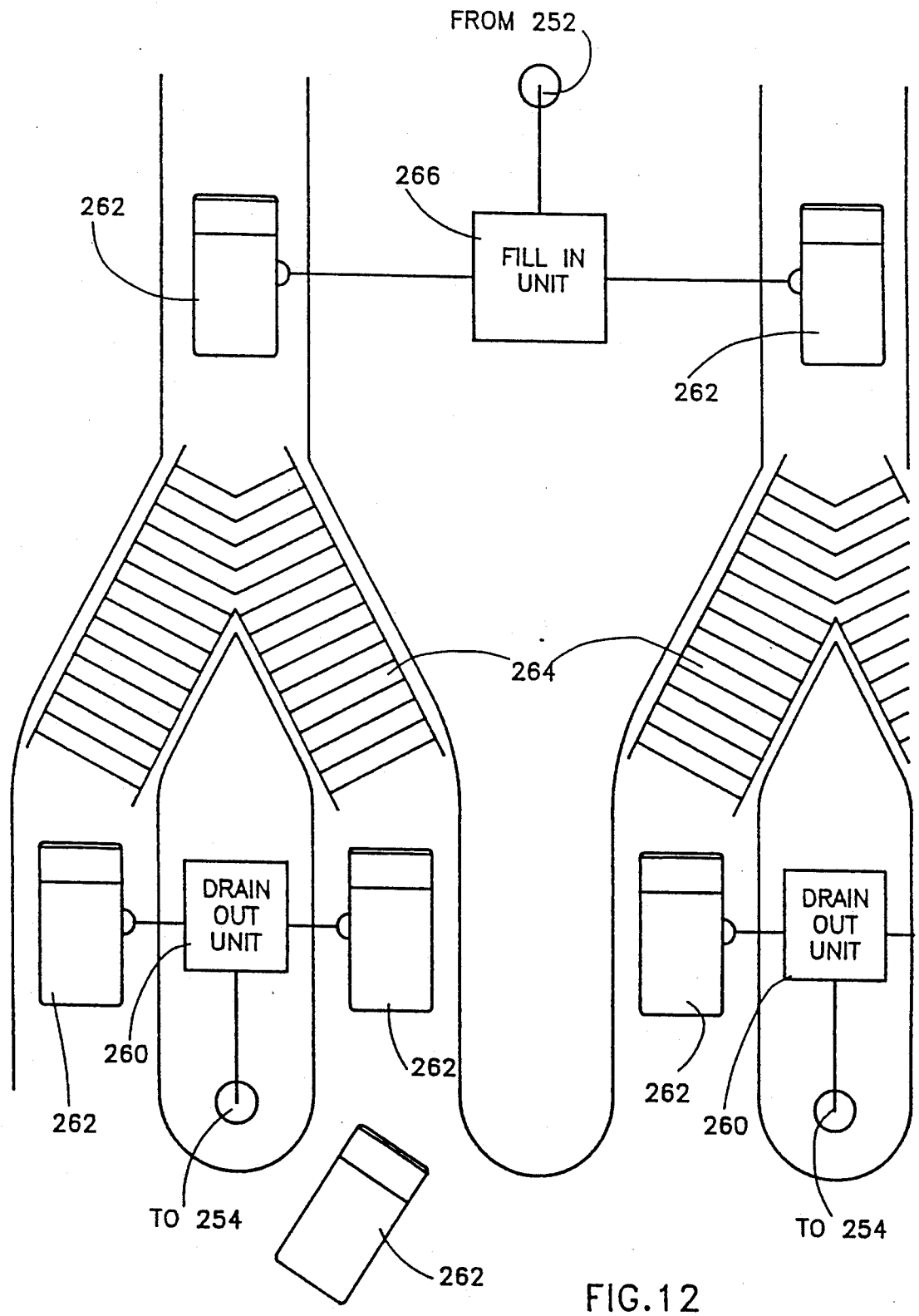
FIG. 12 is a schematic illustration of an electric vehicle battery recharging subsystem forming part of the system of FIGS. 10 and 11.

Reference is now made to FIG. 12, which is a pictorial illustration of an electric vehicle refueling station, such as station 248 (FIG. 11). As shown in FIG. 12, the refueling station includes a plurality of drain units 260 which are operative to remove discharged slurry from electric vehicles 262. The vehicles 262 are typically of the sort shown in and described above in conjunction with FIGS. 5–8C, and employing the electrical power storage system shown and described above in conjunction with FIGS. 1–4. The discharged slurry is supplied to discharged slurry storage tank 254 (FIG. 11).

Automatic moving platforms 264 may be provided for moving the electric vehicles 262 from the drain units 260 to charged slurry supply units 266, which supply charged slurry from charged slurry storage tank 252 to the electric vehicles 262.

Figure 13:
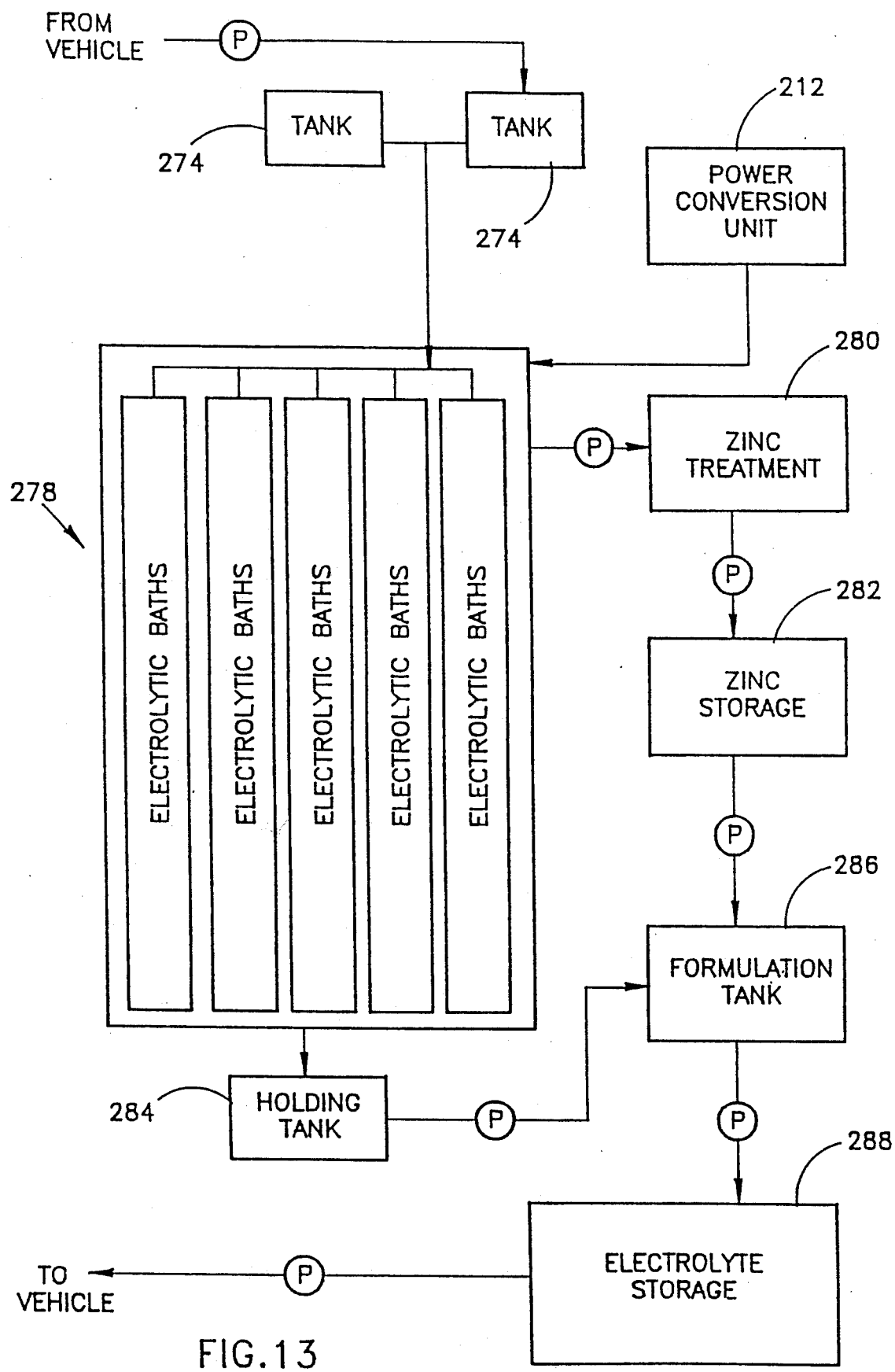
FIG. 13 is a pictorial block diagram of an electrolyte regeneration facility forming part of the system of FIGS. 10 and 11.

Reference is now made to FIG. 13, which illustrates a electrolytic reprocessing subsystem, which is indicated generally by reference numeral 216 in FIG. 10. Discharged slurry, here of the composition: unreacted zinc granules, zinc oxide and alkaline potassium hydroxide solution, stored in tanks 274, is supplied to a bank of electrolytic baths 278, such as modified alkaline zinc plating baths with scrapers for periodically removing zinc deposits thereon. Baths 278 receive an electrical input from power conversion unit 212 (FIG. 10).

Freshly generated zinc mixed with alkaline potassium hydroxide solution is pumped from electrolytic baths 278 to a zinc treatment facility 280, such as a classifier for particle sizing, which provides a purified zinc output to a storage tank 282. KOH is received from electrolytic baths 278 and is supplied to a holding tank 284. The contents of tanks 282 and 284 are supplied to a formulation tank 286 in which they are combined to provide a recharged slurry. The recharged slurry is stored in a storage tank 288.

Figure 14:
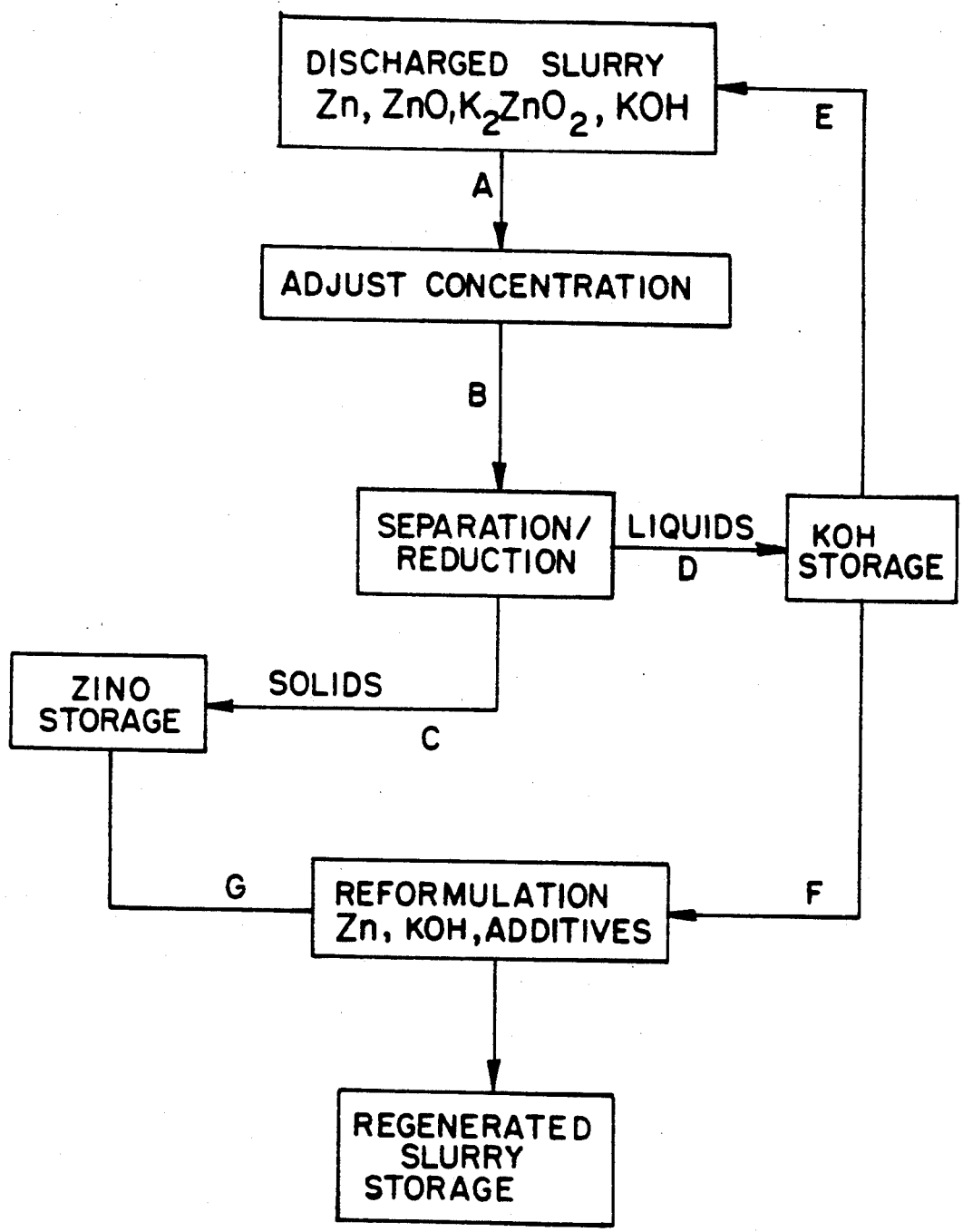
FIG. 14 is a flow chart of the operation of the regeneration facility of FIG. 13.

Reference is now made to FIG. 14, which describes the operation of the apparatus of FIG. 13, It is see that the discharged electrolyte slurry containing Zn, ZnO, potassium zincate, water and KOH has its concentration adjusted by the addition of KOH. Subsequently, the discharged electrolyte having a predetermined concentration undergoes separation and reduction, the KOH being removed to a KOH storage tank such as tank 286 (FIG. 13) and the solids being supplied to a zinc storage facility, such as tank 282 (FIG. 13). The zinc is supplied to a reformulation facility such as tank 284 (FIG. 13) in which KOH and other additives are added to the zinc to provide a regenerated slurry which is stored as in tank 288 (FIG. 13).

Figure 15:
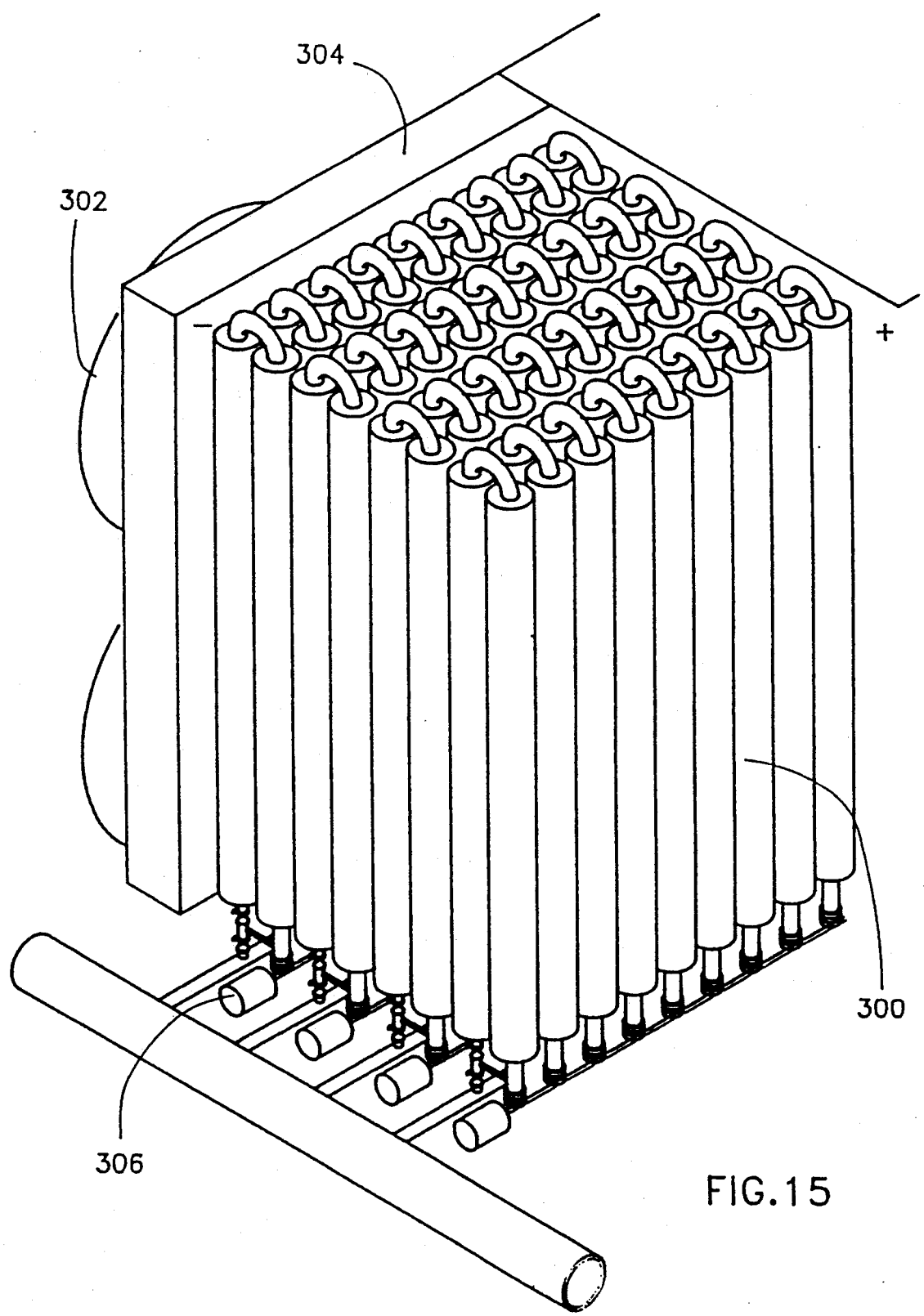
FIG. 15 is a pictorial illustration of a zinc-air utility storage battery useful in the system of FIGS. 10 and 11.
Figure 16:
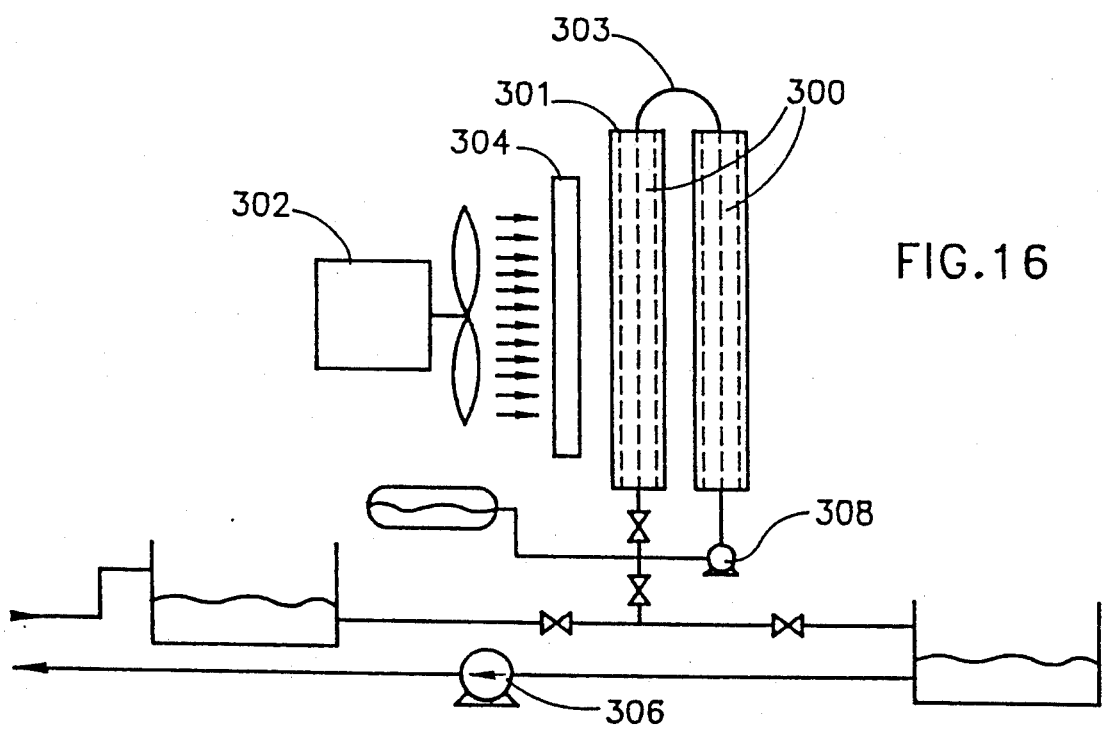
FIG. 16 is a schematic illustration of the connection of the battery of FIG. 15 in its operating environment.
Figure 17:
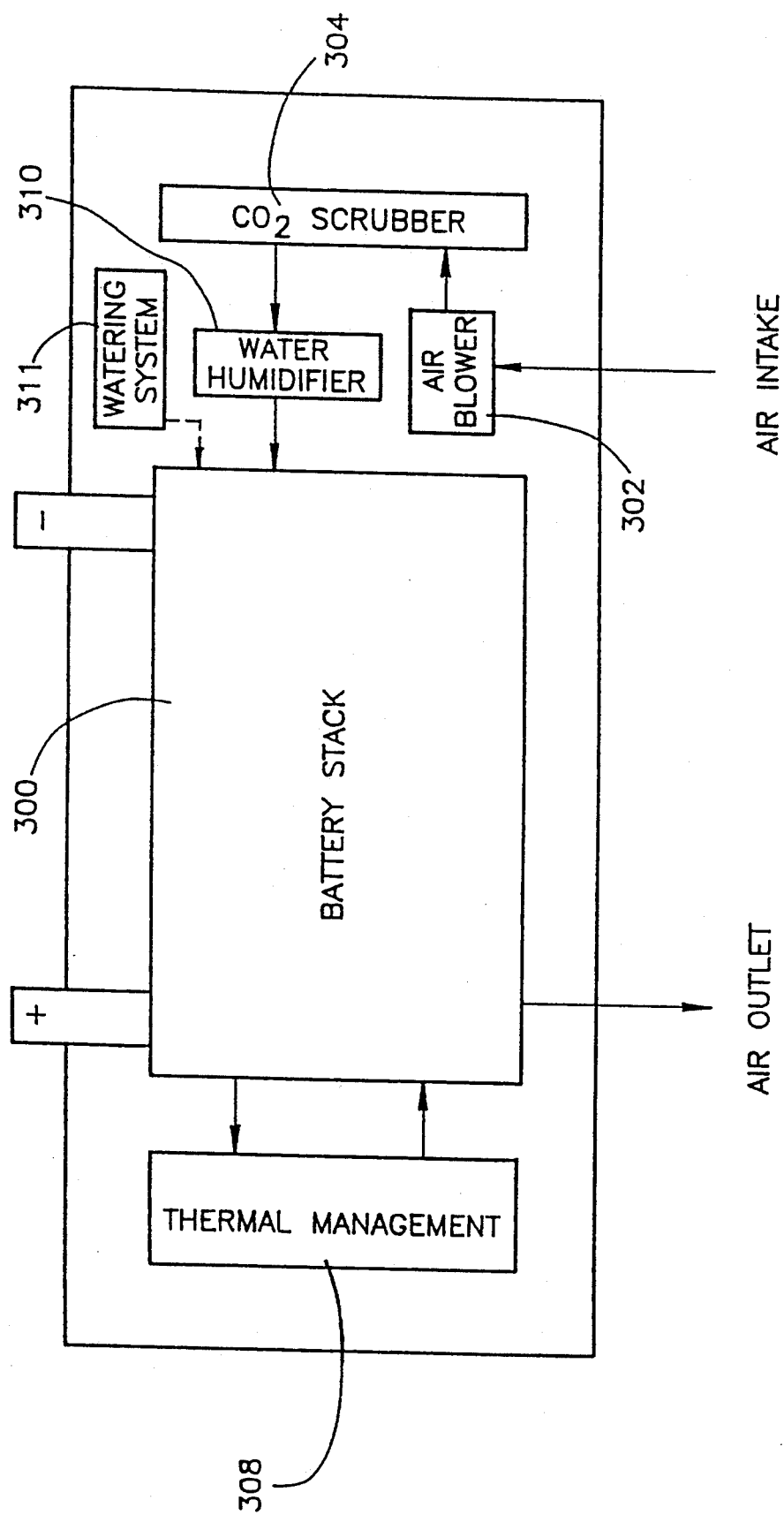
FIG. 17 is a block diagram illustrating the principal functional components of the battery of FIG. 16.

Reference is now made to FIGS. 15, 16 and 17 which illustrate the general configuration of a zinc-air utility storage battery. It is noted that the battery comprises a multiplicity of cells 300, each containing, inter alia, an air electrode 301 and a current collector 303, connected in series. Air is supplied from the outside atmosphere by a blower 302 via a $CO_2$ scrubber 304.

Slurry is pumped to and from the cells 300 by any suitable means, such as pumps 306. Thermal management apparatus 308 is provided as is a water humidifier 310. Apparatus 308 is operative to ensure optimum operating temperatures for the battery irrespective of the local ambient temperature and deals with parasitic heat generated by the battery during discharge. Humidifier 310 is operative to control the humidity of the incoming air to the battery and prevents slurry dry-out.

According to an alternative embodiment of the invention, a watering system 311 (FIG. 17) may also be provided for removing discharge products from the cells 300, and for aiding the thermal and humidity management thereof. Watering system 311 is similar to watering system 11, shown and described above in conjunction with FIGS. 1A, 1B, 9A and 9B, and is therefore not described in detail herein.

Figure 18:
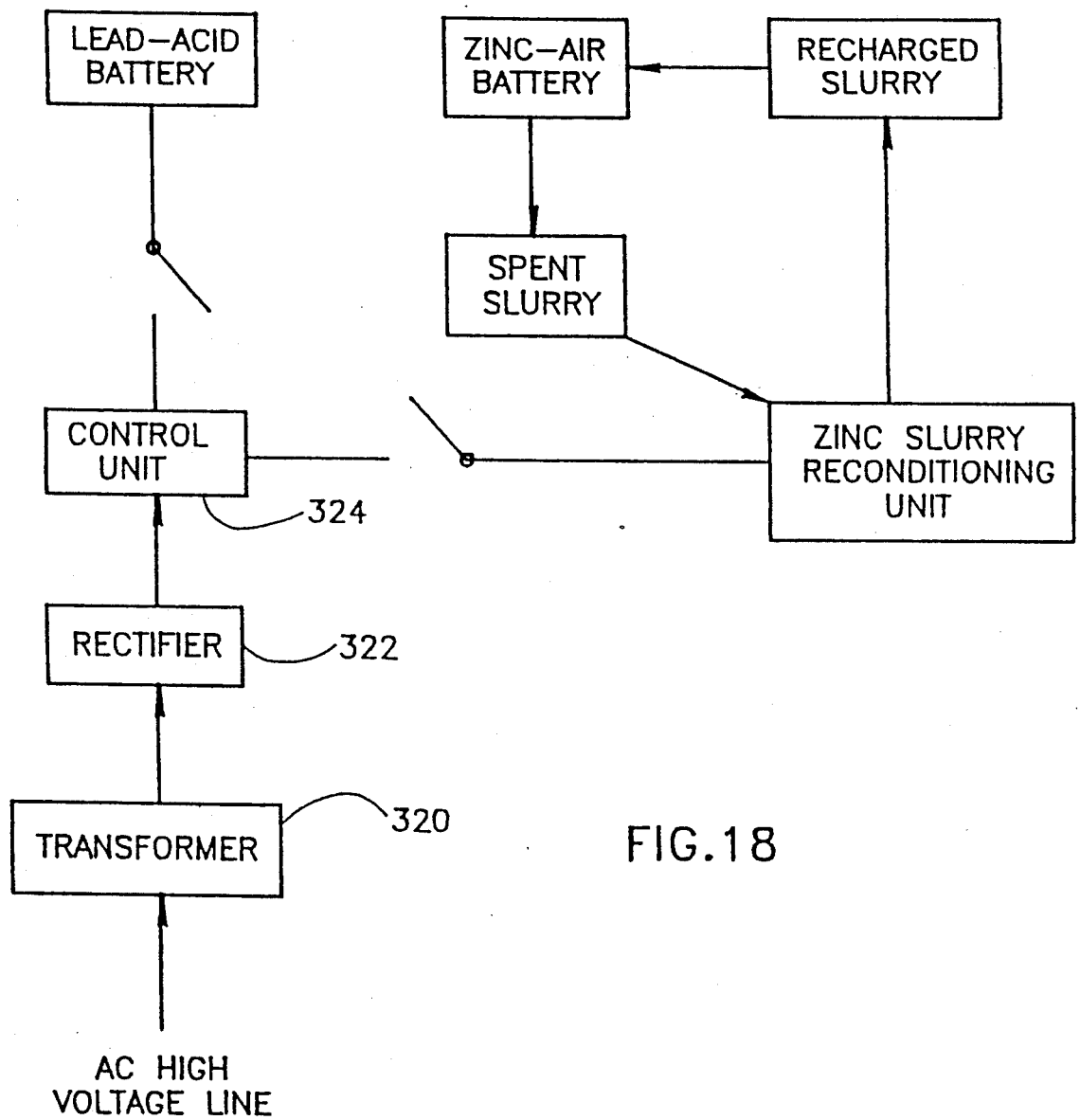
FIGS. 18 and 19 are flow chart illustrations of power station utility battery charging and discharging functions respectively.
Figure 19:
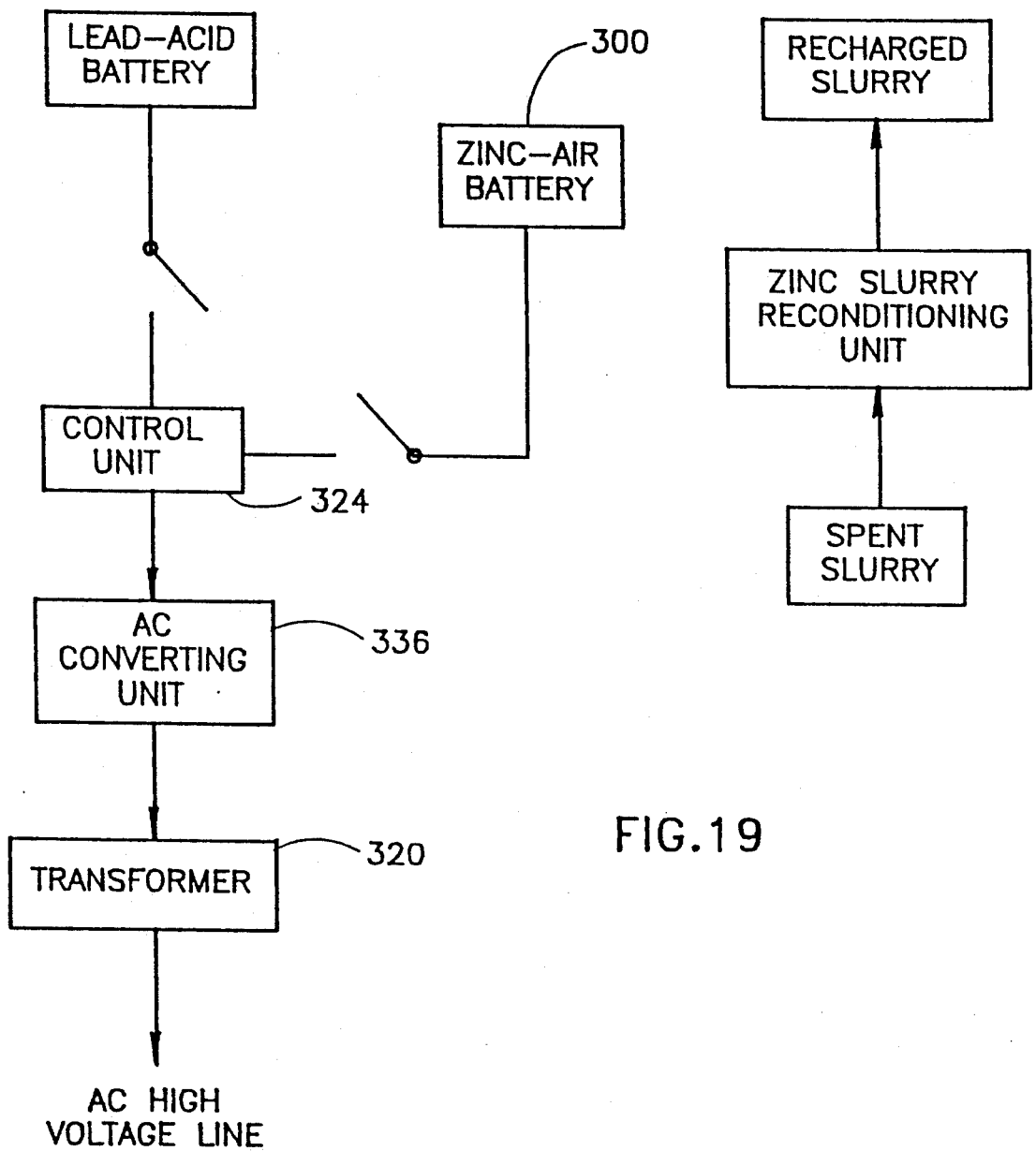

Reference is now made to FIGS. 18 and 19 which illustrate the function of the utility battery during respective charging and discharging operations. During charging, AC line power is supplied via a transformer 320, rectifier 322 and control unit 324 to the battery.

During discharge, as illustrated in FIG. 19, power from the battery 300 is supplied via control unit 324, AC converting unit 336 and transformer 320 to the AC line.

It will be appreciated by persons skilled in the art that the present invention is not limited by what has been particularly shown and described hereinabove. Rather the scope of the present invention is defined only by the claims which follow:

We claim:

1. A rechargeable electrical power storage system employing an electrical power storage medium in the form of a slurry containing active metal particles and an electrolyte solution, the system comprising:
    at least one metal-air cell, each cell including:
        outer electrode means including air electrode means and being configured to define a liquid permeable housing;
        a volume of said active metal particles arranged within said housing so as to define a liquid permeable static bed, which is saturated with the electrolyte solution; and
        inner electrode means arranged within said housing so as to be surrounded by said static bed; and
    means for causing flow of the electrolyte solution through said housing and said static bed.

2. A system according to claim 1, and wherein said means for causing flow comprises means for pumping.

3. A system according to claim 1, and also including means for replacing said volume of said active metal particles and said electrolyte solution with a fresh volume of said active metal particles and fresh electrolyte solution, respectively, thereby recharging said at least one cell.

4. A system according to claim 1, and wherein said means for causing flow of the electrolyte solution is operative to cause flow of the electrolyte solution at a volumetric flow rate in the range 0.01–0.2 ml per minute per Ampere hour.

5. A system according to claim 1, and wherein a solid discharge product forms within the slurry upon electrical discharge thereof, and the electrolyte solution is selected to react with the solid discharge product so as to cause dissolution thereof.

6. A system according to claim 1, and wherein said means for causing flow comprises means for circulating the electrolyte solution which includes:
    means for removing electrolyte solution from said at least one cell;
    electrolyte solution storage means located externally of said at least one cell;
    means for providing electrolyte solution to said at least one cell from said electrolyte solution storage means; and
    means for providing the electrolyte solution removed from said at least one cell to said electrolyte solution storage means, including means for resupplying the removed electrolyte solution to said at least one cell.

7. A system according to claim 6, and wherein excess heat is generated in said at least one cell as the slurry becomes electrically discharged, and wherein said electrolyte storage means is operative to store the electrolyte solution at a temperature below the temperature of said at least one cell, said means for providing electrolyte solution to said at least one cell from said electrolyte solution storage means thus being operative to cool said at least one cell.

8. A system according to claim 1, and wherein the electrolyte solution is an aqueous solution which tends to become dried out as the slurry becomes electrically discharged, and said means for causing flow is operative to prevent the occurrence of said drying out.

9. A system according to claim 1, and wherein said cell is a zinc-air cell in which zinc oxide is produced during the electrical discharge of the slurry.

10. A system according to claim 5, and also including means for removing the dissolved discharge product from the electrolyte solution downstream of said electrical cell.

11. A system according to claim 10, and wherein said means for removing comprises:
   means for receiving electrolyte solution containing the dissolved discharge product; and
   means, associated with said means for receiving, for causing precipitation of the dissolved discharge product into a solid.

12. A system according to claim 11, and wherein said means for removing further comprises:
   means for resupplying electrolyte solution from which dissolved discharge product has been removed to said means for causing flow; and
   means for preventing the reentry of the precipitated solid into the resupplied electrolyte solution.

13. A system according to claim 11, and wherein said means for causing precipitation comprises means for reacting with the dissolved discharge product.

14. A system according to claim 13, and wherein said metal-air cell is a zinc-air cell, said active metal particles comprise zinc, and the discharge product is zinc oxide.

15. A system according to claim 13, and wherein said metal-air cell is an aluminum-air cell, said active metal particles comprise aluminum, and the discharge product is aluminum oxide.

16. A system according to claim 11, and wherein said metal-air cell is a zinc-air cell, said active metal particles comprise zinc, the discharge product is zinc oxide, and said means for causing precipitation comprises nucleation site material on which dissolved zinc oxide is operative to precipitate into a solid form.

17. A system according to claim 11, and wherein said metal-air cell is a zinc-air cell, said active metal particles comprise zinc, the discharge product is zinc oxide, and said means for causing precipitation comprises:
   means for directing droplets of the electrolyte solution containing dissolved zinc oxide along a first line of sight; and
   means for directing droplets of de-ionized water along a second line of sight intersecting with said first line of sight, thereby causing the formation of zinc oxide in solid form.

18. Electrically powered transport apparatus comprising:
   an electrically powered vehicle having vehicle drive means; and
   rechargeable electrical power storage means, coupled to said vehicle drive means, and employing an electrical power storage medium in the form of a slurry containing active metal particles and an electrolyte solution, said power storage means comprising:
   at least one metal-air cell, each cell including:
     outer electrode means including air electrode means and being configured to define a liquid permeable housing;
     a volume of said active metal particles arranged within said housing so as to define a liquid permeable static bed which is saturated with the electrolyte solution; and
     inner electrode means arranged within said housing so as to be surrounded by said static bed; and
   means for causing flow of the electrolyte solution through said housing and said static bed.

19. Apparatus according to claim 18, and wherein said means for causing flow comprises means for pumping.

20. Apparatus according to claim 18, and also including means for replacing said volume of said active metal particles and the electrolyte solution with a fresh volume of said active metal particles and fresh electrolyte solution, respectively, thereby recharging said at least one cell.

21. Apparatus according to claim 18, and wherein said means for causing flow of electrolyte solution is operative to cause flow of the electrolyte solution at a volumetric flow rate in the range 0.01-0.2 ml per minute per Ampere hour.

22. Apparatus according to claim 18, and wherein a solid discharge product forms within the slurry upon electrical discharge thereof, and the electrolyte solution is selected to react with the solid discharge product so as to cause dissolution thereof.

23. Apparatus according to claim 18, and wherein said means for causing flow includes:
   means for removing electrolyte solution from said at least one cell;
   electrolyte solution storage means located externally of said at least one cell;
   means for providing electrolyte solution to said at least one cell from said electrolyte solution storage means; and
   means for providing the electrolyte solution removed from said at least one cell to said electrolyte solution storage means, including means for resupplying the removed electrolyte solution to said at least one cell.

24. Apparatus according to claim 23, and wherein excess heat is generated in said at least one cell as the slurry becomes electrically discharged, and wherein said electrolyte storage means is operative to store the electrolyte solution at a temperature below the temperature of said at least one cell, said means for providing electrolyte solution to said at least one cell from said electrolyte solution storage means thus being operative to cool said at least one cell.

25. Apparatus according to claim 18, and wherein the electrolyte solution is an aqueous solution which tends to become dried out as the slurry becomes electrically discharged, and said means for causing flow is operative to prevent the occurrence of said drying out.

26. Apparatus according to claim 22, and also including means for removing the dissolved discharge product from the electrolyte solution downstream of said electrical cell.

27. Apparatus according to claim 26, and wherein said means for removing comprises:
   means for receiving electrolyte solution containing the dissolved discharge product; and
   means, associated with said means for receiving, for causing precipitation of the dissolved discharge product into a solid.

28. Apparatus according to claim 27, and wherein said means for removing further comprises:
   means for resupplying electrolyte solution from which dissolved discharge product has been removed to said means for causing flow; and
   means for preventing the reentry of the precipitated solid into the resupplied electrolyte solution.

29. Apparatus according to claim 27, and wherein said means for causing precipitation comprises means for reacting with the dissolved discharge product.

30. Apparatus according to claim 29, and wherein said power storage means is zinc-air power storage means, said active metal particles comprise zinc, and the discharge product is zinc oxide.

31. Apparatus according to claim 29, and wherein said power storage means is aluminum-air power storage means, said active metal particles comprise aluminum, and the discharge product is aluminum oxide.

32. Apparatus according to claim 27, and wherein said metal-air cell is a zinc-air cell, said active metal particles comprise zinc, the discharge product is zinc oxide, and said means for causing precipitation comprises nucleation site material on which dissolved zinc oxide is operative to precipitate into a solid.

33. Apparatus according to claim 27, and wherein said metal-air cell is a zinc-air cell, said active metal particles comprise zinc, the discharge product is zinc oxide, and said means for causing precipitation comprises:
means for directing droplets of electrolyte solution containing dissolved zinc oxide along a first line of sight; and
means for directing droplets of de-ionized water along a second line of sight intersecting with said first line of sight, thereby causing the formation of zinc oxide in solid form.

34. A method of extending the useful life of a rechargeable, electrical, metal-air, power storage system employing an electrical power storage medium in the form of a slurry containing active metal particles and an electrolyte solution, said method comprising the following steps:
enclosing a volume of the active metal particles in operative association with at least one air electrode associated with a first current collector, thereby providing a static bed of the active metal particles;
saturating the static bed of active metal particles with electrolyte solution;
arranging a second current collector in operative association with the saturated static bed; and
causing a flow of the electrolyte solution through the static bed, thereby prolonging the useful life of the power storage system.

35. A method according to claim 34, and wherein said step of causing a flow comprises pumping the electrolyte solution through the static bed.

36. A method according to claim 34, and wherein said step of causing flow of the electrolyte solution comprises the step of causing flow of the electrolyte solution at a volumetric flow rate in the range 0.01–0.2 ml per minute per Ampere hour.

37. A method according to claim 34, and wherein a solid discharge product forms within the slurry upon electrical discharge thereof, and said step of causing flow comprises the step of causing the flow of an electrolyte solution selected to react with the solid discharge product so as to cause dissolution thereof.

38. A method according to claim 34, and wherein said step of causing flow includes the following steps:
removing electrolyte solution from the static bed;
providing electrolyte solution to the static bed from electrolyte solution storage means; and
providing the electrolyte solution removed from the static bed to said electrolyte solution storage means, so as to resupply the removed electrolyte solution to the static bed.

39. A method according to claim 38, and wherein excess heat is generated in said at least one cell as the slurry becomes electrically discharged, and wherein the electrolyte storage means is operative to store the electrolyte solution at a temperature below the temperature of the static bed, said step of providing electrolyte solution to the static bed from said electrolyte solution storage means thus including the step of cooling the static bed.

40. A method according to claim 34, and wherein the electrolyte solution is an aqueous solution which tends to become dried out as the slurry becomes electrically discharged, and said step of causing flow comprises the step of preventing the occurrence of said drying out.

41. A method according to claim 37, and also including the step of removing the dissolved discharge product from the electrolyte solution downstream of said static bed.

42. A method according to claim 41, and wherein said step of removing comprises the following steps:
receiving electrolyte solution containing the dissolved discharge product; and
precipitating the dissolved discharge product into a solid.

43. A method according to claim 42, and wherein said step of removing further comprises the steps of:
resupplying electrolyte solution from which dissolved discharge product has been removed to the static bed; and
preventing the reentry of the precipitated solid into the resupplied electrolyte solution.

44. A method according to claim 42, and wherein said step of precipitating comprises the step of bringing a selected reagent into reactive contact with dissolved discharge product.

45. A method according to claim 42, and wherein said metal-air cell is a zinc-air cell, said active metal particles comprise zinc, the discharge product is zinc oxide, and said step of precipitating comprises passing the electrolyte solution containing the dissolved zinc oxide through a selected nucleation site material, thereby causing precipitation of the dissolved zinc oxide into a solid.

46. A method according to claim 42, and wherein said metal-air cell is a zinc-air cell, said active metal particles comprise zinc, the discharge product is zinc oxide, and said step of precipitating comprises the steps of:
directing droplets of electrolyte containing dissolved zinc oxide along a first line of sight; and
directing droplets of de-ionized water along a second line of sight intersecting with said first line of sight, thereby causing the formation of zinc oxide in solid form.

47. An electrical energy system comprising: an electric utility having electricity generation apparatus and distribution lines;
a plurality of electric vehicles, each having vehicle drive means;
a plurality of rechargeable electrical power storage units, each coupled to said vehicle drive means of one of said plurality of electric vehicles, and employing an electrical power storage medium in the form of a slurry containing active metal particles and an electrolyte solution, said power storage means having at least one metal-air cell comprising:
outer electrode means including air electrode means and being configured to define a liquid permeable housing;
a volume of said active metal particles arranged within said housing so as to define a liquid permeable static bed which is saturated with the electrolyte solution; and inner electrode means arranged within said housing so as to be surrounded by said static bed;

means for causing flow of the electrolyte solution through said housing and said static bed; and electrical power storage means receiving electrical power from the electric utility and supplying electrical power to each of said plurality of rechargeable electrical power storage units and to the electric utility, when required.

48. A system according to claim 47, and wherein said means for causing flow comprises means for pumping.

49. A system according to claim 47, and also including means for replacing said volume of said active metal particles and the electrolyte solution with a fresh volume of said active metal particles and fresh electrolyte solution, respectively, thereby recharging said at least one cell.

50. A system according to claim 47, and wherein said means for causing flow of electrolyte solution is operative to cause flow of the electrolyte solution at a volumetric flow rate in the range 0.01–0.2 ml per minute per Ampere hour.

51. A system accoding to claim 47, and wherein a solid discharge product forms within the slurry upon electrical discharge thereof, and the electrolyte solution is selected to react with the solid discharge product so as to cause dissolution thereof.

52. A system according to claim 47, and wherein said means for causing flow includes:
   means for removing electrolyte solution from said at least one cell;
   electrolyte solution storage means located externally of said at least one cell;
   means for providing electrolyte solution to said at least one cell from said electrolyte solution storage means; and
   means for providing the electrolyte solution removed from said at least one cell to said electrolyte solution storage means, including means for resupplying the removed electrolyte solution to said at least one cell.

53. A system according to claim 52, and wherein excess heat is generated in said at least one cell as the slurry becomes electrically discharged, and wherein said electrolyte storage means is opertive to store the electrolyte solution at a temperature below the temperature of said at least one cell, said means for providing electrolyte solution to said at least one cell from said electrolyte solution storage means thus being operative to cool said at least one cell.

54. A system according to claim 47, and wherein the electrolyte solution is an aqueous solution which tends to become dried out as the slurry becomes electrically discharged, and said means for causing flow is operative to prevent the occurrence of said drying out.

55. A system according to claim 51, and also including means for removing the dissolved discharge product from the electrolyte solution downstream of said electrical cell.

56. A system according to claim 55, and wherein said means for removing comprises:
   means for receiving electrolyte solution containing the dissolved discharge product; and
   means, associated with said means for receiving, for causing precipitation of the dissolved discharge product into a solid.

57. A system according to claim 56, and wherein said means for removing further comprises:

means for resupplying electrolyte solution from which dissolved discharge product has been removed to said means for causing flow; and means for preventing the re-entry of the precipitated solid into the resupplied electrolyte solution.

58. A system according to claim 56, and wherein said means for causing precipitation comprises means for reacting with the dissolved discharge product.

59. A system according to claim 58, and wherein said cell is a zinc-air cell, said active metal particles comprise zinc, and the discharge product is zinc oxide.

60. A system according to claim 58, and wherein said cell is an aluminum-air cell, said active metal particles comprise aluminum, and the discharge product is aluminum oxide.

61. A system according to claim 56, and wherein said metal-air cell is a zinc-air cell, said active metal particles comprise zinc, the discharge product is zinc oxide, and said means for causing precipitation comprises nucleation site material on which dissolved zinc oxide is operative to precipitate into a solid.

62. A system according to claim 56, and wherein said metal-air cell is a zinc-air cell, said active metal particles comprise zinc, the discharge product is zinc oxide, and said means for causing precipitation comprises:
   means for directing droplets of electrolyte solution containing dissolved zinc oxide along a first line of sight; and
   means for directing droplets of de-ionized water along a second line of sight intersecting with said first line of sight, thereby causing the formation of zinc oxide in solid form.

63. A system according to claim 47, and wherein said electric power storage means is operative to receive electrical power from the electrical utility at off-peak times and to provide electrical power to the electrical utility at peak demand times.

64. A system according to claim 47, and wherein said electric power storage means includes surge switching means for enabling the electric power storage means to absorb undesired power surges from the electrical utility in real time or near real time.

65. A system according to claim 47, and wherein said electric power storage means is operative to provide electrical power to the electrical utility at peak and super peak demand.

66. A system according to claim 47, and wherein said electric power storage means is operative to provide electrical power to the electrical utility at real or near real time to serve as a spinning reserve.

67. A system according to claim 47, and wherein said electric power storage means includes electrical power storage units employing a slurry containing active metal particles and an electrolyte solution as a rechargeable electrical energy storage medium.

68. A system according to claim 67, and wherein said plurality of rechargeable electrical power storage units coupled to said vehicle drive means are employed for relatively more frequent charging and discharging, while said electrical power storage units of said electric power storage means are employed for less frequent charging and discharging.

69. A system according to claim 47, and also comprising an electric vehicle recharging depot including apparatus for removing electrically discharged slurry from vehicles and supplying it to a storage facility to await off-peak recharging and means for supplying recharged slurry to vehicles from the electric power storage means.

* * * * *